(12) United States Patent
Konishi et al.

(10) Patent No.: US 8,023,509 B2
(45) Date of Patent: Sep. 20, 2011

(54) COMMUNICATION TERMINAL AND RETRANSMISSION REQUEST METHOD

(75) Inventors: Kazunobu Konishi, Tokyo (JP); Eiichi Muramoto, Kanagawa (JP); Takahiro Yoneda, Tokyo (JP)

(73) Assignee: Panasonic Corporation, Osaka (JP)

( * ) Notice: Subject to any disclaimer, the term of this patent is extended or adjusted under 35 U.S.C. 154(b) by 196 days.

(21) Appl. No.: 12/301,598

(22) PCT Filed: May 17, 2007

(86) PCT No.: PCT/JP2007/060155
§ 371 (c)(1),
(2), (4) Date: Nov. 19, 2008

(87) PCT Pub. No.: WO2007/135959
PCT Pub. Date: Nov. 29, 2007

(65) Prior Publication Data
US 2009/0245252 A1    Oct. 1, 2009

(30) Foreign Application Priority Data

| May 22, 2006 | (JP) | 2006-142127 |
| Sep. 20, 2006 | (JP) | 2006-255098 |

(51) Int. Cl.
*H04L 12/56* (2006.01)
(52) U.S. Cl. ......... 370/390; 370/432
(58) Field of Classification Search .......... 370/389, 370/229, 432, 224, 390
See application file for complete search history.

(56) References Cited

U.S. PATENT DOCUMENTS

| 6,310,911 B1 * | 10/2001 | Burke et al. ............ 375/224 |
| 6,526,022 B1 * | 2/2003 | Chiu et al. ............ 370/229 |
| 6,724,770 B1 * | 4/2004 | Van Renesse ............ 370/432 |
| 2005/0180415 A1 * | 8/2005 | Cheung et al. ............ 370/389 |
| 2006/0256785 A1 * | 11/2006 | Nagai et al. ............ 370/389 |
| 2006/0268871 A1 * | 11/2006 | Van Zijst ............ 370/390 |

FOREIGN PATENT DOCUMENTS

JP    5-347623    12/1993

(Continued)

OTHER PUBLICATIONS

Y. Imai, et al., "XCAST6: eXplicit Multicast on IPv6," IEEE/IPSJ SAINT2003 Workshop 4, IPv6 and Applications, Jan. 2003, p. 6, line 24.

(Continued)

*Primary Examiner* — Kwang B Yao
*Assistant Examiner* — Syed M Bokhari
(74) *Attorney, Agent, or Firm* — Dickinson Wright PLLC

(57) ABSTRACT

A multicast communication system in which a receiving node which has detected a packet loss can make a retransmission request without applying a high load to a transmitting node, all receiving nodes, and the band of the entire network. The transmitting node transmits an explicit multicast data packet including an address list including a plurality of destination addresses and a bitmap indicating whether the data packet has been delivered to the respective destination addresses, to a plurality of the receiving nodes. The receiving node which has detected the packet loss checks an address list and bitmap of another data packet received and selects a receiving node to which the another data packet has been delivered as a retransmission requester. The receiving node which has detected the packet loss creates a unicast retransmission request packet with the selected receiving node as the destination and transmits it to the selected receiving node.

12 Claims, 32 Drawing Sheets

FOREIGN PATENT DOCUMENTS

| | | |
|---|---|---|
| JP | 9-191314 | 7/1997 |
| JP | 2000-307580 | 11/2000 |
| JP | 2001-103051 | 4/2001 |
| JP | 2002-084239 | 3/2002 |

OTHER PUBLICATIONS

S. Floyd, et al., "A Reliable Multicast Framework for Ligt-Weight Sessions and Application Level Framing," IEEE/ACM Transactions of Networking, vol. 5, No. 6, Dec. 1997, pp. 784-803, p. 6, line 27.

M. Handley, et al., "TCP Friendly Rate Control (TFRC): Protocol Specification," RFC 3448, Standards Track, Jan. 2003, pp. 1-18, p. 80, line 15.

M. Ito et al., "Ko Shinraisei XCAST Protocol no Sekkei," Transactions of Information Processing Society of Japan, vol. 43, No. 11, Nov. 15, 2002, pp. 3530 to 3539, p. 3531, '3.1' to p. 3532, '3.2'.

Y. Imai et al., "IPv6 ni yoru Meijiteki Multi cast:XCAST6," Fujitsu, vol. 54, No. 1, Jan. 10, 2003, pp. 75 to 79, pp. 77 to 78, 'XCAST6 no Kihon Gainen to Kozo'.

* cited by examiner

| RECEIVING NODE | RESPONSE TIME (ms) |
|---|---|
| A | 5 |
| B | 30 |
| C | 23 |

COMMUNICATION TERMINAL AND RETRANSMISSION REQUEST METHOD

TECHNICAL FIELD

The present invention relates to a communication terminal apparatus and retransmission request method in multicast communication, and more particularly to a communication terminal apparatus and retransmission request method that make a packet retransmission request when a packet loss occurs in multicast communication.

BACKGROUND ART

With the rapid development of networks in recent years, opportunities have increased for one transmitting node to transmit the same packet to a plurality of receiving nodes, as in the case of video conferencing, network gaming, and so forth. In such cases, a transmitting node often performs distribution by means of multicast communication, which enables the same packet to be transmitted efficiently to all receiving nodes. For example, a transmitting node divides receiving nodes comprising packet distribution destinations into groups composed of around ten receiving nodes, and distributes a packet to each group by means of multicast communication.

One communication method that performs multicast communication on a group-by-group basis is an explicit multicast method. With an explicit multicast method, a transmitting node explicitly specifies all receiving nodes by entering the addresses of all the receiving nodes in a group in a packet option header or pilot. A typical explicit multicast method is XCAST (Explicit Multicast) (see Non-patent Document 1).

Generally, when multicast communication is performed to receiving nodes in the same group, all packet relay apparatuses (hereinafter referred to as "routers") in a route must be compatible with multicast communication However, with an explicit multicast method, a transmitting node can distribute a packet to all receiving nodes whose addresses are entered in the packet even if all routers in a route are not compatible with an explicit multicast method. At this time, a bit sequence (hereinafter referred to as "bitmap") in the packet header performs management of whether or not the packet has been distributed for each receiving node.

Here, a packet distribution method in explicit multicast communication will be described separately for a case in which all routers in a route are compatible with an explicit multicast method, and a case in which they are not. A packet is also distributed to all receiving nodes by means of the same kind of distribution method when only some of the routers in a route are compatible with an explicit multicast method.

On receiving a packet from another node, a router that is compatible with an explicit multicast method (hereinafter referred to as "compatible router") searches the unicast route table of the router for all destination addresses entered in the packet option header or pilot to check a transmission interface corresponding to each destination address. Next, the compatible router duplicates the packet a number of times equivalent to the number of transfer destination interfaces, and transmits a packet corresponding to each interface. At this time, the compatible router scans a bitmap in the header for each duplicated packet, and adds a distribution-completed mark to a bit corresponding to a receiving node not included in the transfer destination interfaces. Furthermore, the compatible router rewrites a destination address entered in the IP header as a destination address of a distribution-unperformed receiver. Through repeated packet duplication and transmission by compatible routers in a route in this way, a packet is distributed to all receiving nodes.

Meanwhile, a router that is not compatible with an explicit multicast method (hereinafter referred to as "non-compatible router"), on receiving a packet from another node, does not reference a destination address entered in the packet option header or pilot, but transmits a packet in the same way as in ordinary unicast communication by searching the unicast route table of the router for a destination address entered in the IP header. On receiving a packet, a receiving node scans a bitmap in the header, and checks for the presence of a distribution-unperformed destination address. If there is a distribution-unperformed destination address, the receiving node duplicates a packet in which the IP header destination address has been rewritten as a distribution-unperformed destination address, and transmits this to a router. At this time, the receiving node adds a distribution-completed mark to a bit corresponding to itself contained in the bitmap. By having a receiving node that has received a packet transmit the received packet to a router again in this way, a packet is transferred to all receiving nodes. This kind of distribution is called "daisy-chain distribution".

Using the above approach, a packet can be distributed to all receiving nodes by means of an explicit multicast method even if not all routers in a route are compatible with an explicit multicast method. Therefore, if an explicit multicast method is used, multicast communication can be performed using the Internet without replacing all routers in a route on the Internet with compatible routers.

Generally, in the event of congestion or the like in network communication, a packet traveling on the network may be lost (hereinafter referred to as "packet loss"). If a packet loss occurs in communication in which data must not be lost, such as a file transfer, a receiving node requests the transmitting node to retransmit a packet for which a packet loss occurred. However, in multicast communication, if all receiving nodes detecting a packet loss make a retransmission request to the transmitting node, there is a problem of an increased load on the transmitting node that receives the transmission requests, which affects normal communication. The following two methods whereby a receiving node makes a retransmission request to a node other than the transmitting node have been disclosed as solutions to this problem.

The first method is to provide an intermediate node for retransmission in a network. A receiving node that detects a packet loss makes a retransmission request to an intermediate node using multicast communication. An intermediate node that receives a retransmission request retransmits a packet to the receiving node that made the retransmission request using unicast communication or multicast communication (see Patent Document 1, for example).

The second method is to make a retransmission request without providing an intermediate node in a network. A receiving node that detects a packet loss waits for a random time before making a retransmission request to all receiving nodes by means of multicast communication. A receiving node that receives a retransmission request transmits a retransmission packet by means of multicast communication in accordance with a predetermined probability. If a receiving node receives a retransmission packet from another receiving node before retransmitting a packet itself, it does not transmit a retransmission packet despite receiving a retransmission request. Also, even if a receiving node detects a packet loss, it does not transmit a retransmission packet if a retransmission packet arrives by means of multicast communication during the wait time until transmission of a retransmission request (see Non-patent Document 2, for example).

Receiving nodes using these methods cannot know the IP address of another receiving node participating in multicast communication. Therefore, a receiving node that detects a packet loss transmits a retransmission request packet to another node using multicast communication, not unicast communication.

Through the use of these methods, even if a packet loss occurs in multicast communication, a receiving node can make a retransmission request to another node (intermediate node or receiving node) without imposing a load on the transmitting node.

Patent Document 1: Japanese Patent Application Laid-Open No. 2001-103051

Non-patent Document 1: Y. Imai, M. Shin and Y. Kim, "XCAST6: eXplicit Multicast on IPv6", IEEE/IPSJ SAINT2003 Workshop 4, IPv6 and Applications, Orland, January 2003.

Non-patent Document 2: Sally Floyd, Van Jacobson, Ching-Gung Liu, Steven McCanne and Lixia Zhang, "A Reliable Multicast Framework for Light-weight Sessions and Application Level Framing", IEEE/ACM Transactions on Networking, Vol. 5, No. 6, December 1997.

DISCLOSURE OF INVENTION

Problems to be Solved by the Invention

However, a problem with the above conventional methods is that a retransmission request packet is sent over the entire network each time a packet loss occurs, and therefore a high load is imposed on the band of the entire network. A further problem is that all nodes (intermediate nodes or receiving nodes) that receive a retransmission request packet perform retransmission request reception processing, and therefore the processing load of each node increases.

It is an object of the present invention to provide a communication terminal apparatus and retransmission request method that enable a retransmission request to be made without imposing a load on a band of an entire network and another node in multicast communication.

Means for Solving the Problems

A communication terminal apparatus of the present invention receives a data packet by means of multicast communication, and employs a configuration having: a packet receiving section that receives a data packet; a packet loss detecting section that detects that a packet loss has occurred in a series of data packets received by the packet receiving section; a retransmission request destination selecting section that, when the packet loss detecting section detects the occurrence of a packet loss, selects an IP address of a retransmission request destination from one or more IP addresses entered in a distribution destination address list of a data packet received by the packet receiving section; a retransmission request packet creating section that creates a retransmission request packet that makes a request for retransmission of data of a data packet for which a packet loss occurred to the IP address of the retransmission request destination; and a packet transmitting section that transmits the retransmission request packet to the IP address of the retransmission request destination.

A retransmission request method of the present invention is a retransmission request method for data in multicast communication, and has: a step of receiving a data packet; a step of detecting that a packet loss has occurred in a received series of data packets; a step of selecting an IP address of a retransmission request destination from one or more IP addresses entered in a distribution destination address list of a received data packet when the occurrence of a packet loss is detected; a step of creating a retransmission request packet that makes a request for retransmission of data of a data packet for which a packet loss occurred to the IP address of the retransmission request destination; and a step of transmitting the retransmission request packet to the IP address of the retransmission request destination.

Advantageous Effect of the Invention

According to the present invention, a communication terminal apparatus serving as a receiving node makes a retransmission request to a specific receiving node by means of unicast communication in the event of detecting a packet loss, enabling a retransmission request to be made without imposing a load on a band of an entire network and all nodes.

BRIEF DESCRIPTION OF DRAWINGS

FIG. 22 is a drawing showing a table containing response times of other receiving nodes;

BEST MODE FOR CARRYING OUT THE INVENTION

Embodiments of the present invention will now be described with reference to the accompanying drawings.

Embodiment 1

Figure 1:
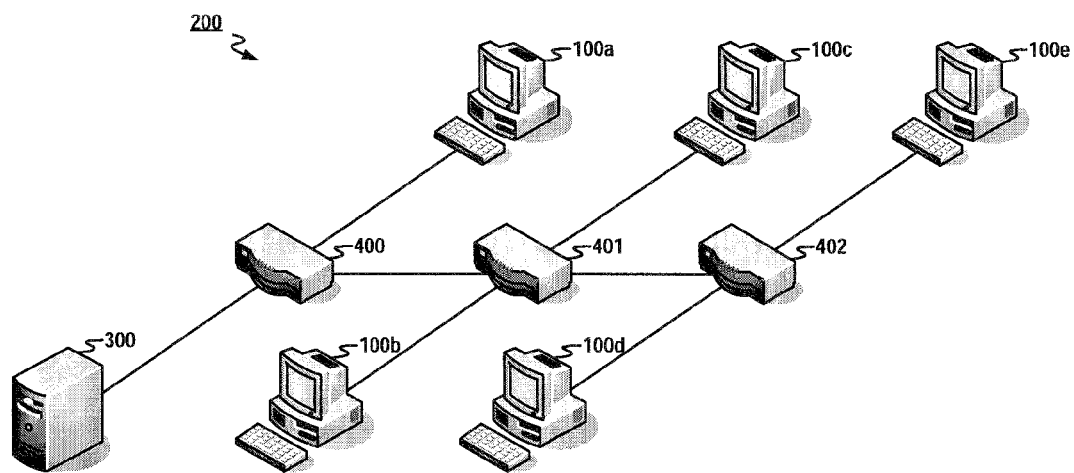
FIG. 1 is a drawing showing an overview of a communication network for explaining the flow of multicast communication in which a communication terminal apparatus according to each embodiment of the present invention is made a receiving node.

FIG. 1 is a drawing showing an overview of a communication network for explaining the operation of a communication terminal apparatus according to Embodiment 1 of the present invention.

In FIG. 1, communication network 200 is composed of one transmitting node 300, three routers 400 through 402, and five communication terminal apparatuses 100a through 100e.

Transmitting node 300 creates an explicit multicast data packet, and distributes this to communication terminal apparatuses 100a through 100e.

Routers 400 through 402 perform packet routing based on destination address information contained in a packet in communication network 200.

Communication terminal apparatuses 100a through 100e are receiving nodes that receive a data packet transmitted by transmitting node 300. Also, as described later herein, communication terminal apparatuses 100a through 100e perform retransmission request packet creation and transmission when they detect a packet loss, and perform retransmission packet creation and transmission when they receive a retransmission request packet. Below, communication terminal apparatus 100a may be referred to as "receiving node A", communication terminal apparatus 100b as "receiving node B", communication terminal apparatus 100c as "receiving node C", communication terminal apparatus 100d as "receiving node D", and communication terminal apparatus 100e as "receiving node E".

Figure 2:
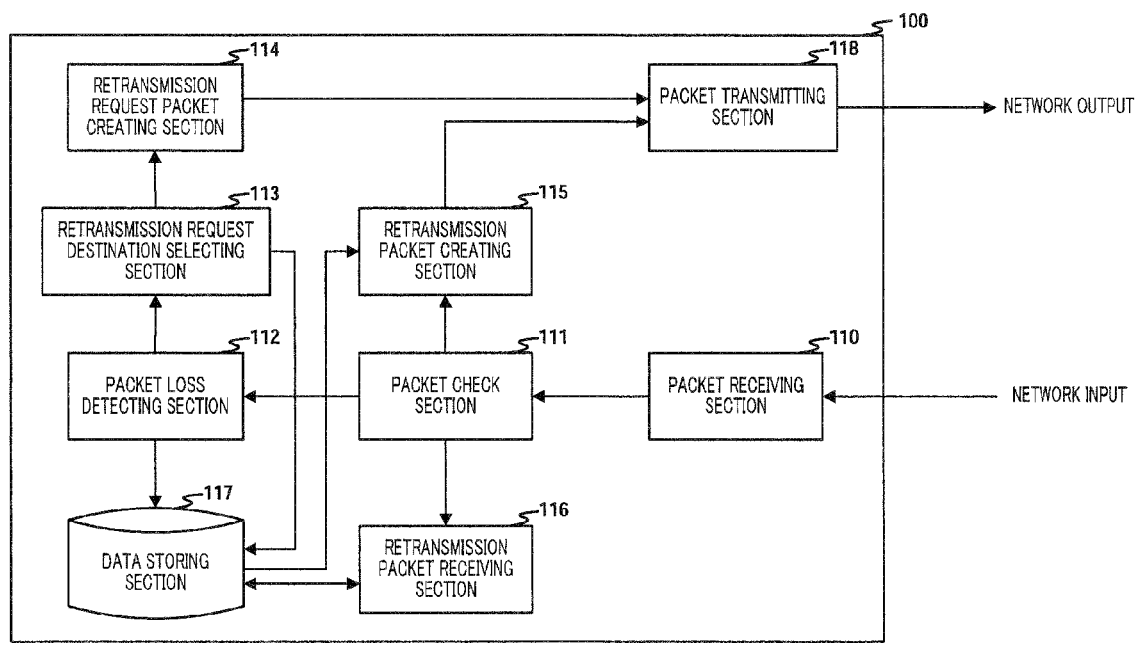
FIG. 2 is a block diagram showing the configuration of a communication terminal apparatus according to Embodiment 1 of the present invention.

FIG. 2 is a block diagram showing the configuration of communication terminal apparatus 100 in FIG. 1. Any of communication terminal apparatuses 100a through 100e is here referred to as communication terminal apparatus 100.

In FIG. 2, communication terminal apparatus 100 comprises packet receiving section 110, packet check section 111, packet loss detecting section 112, retransmission request destination selecting section 113, retransmission request packet creating section 114, retransmission packet creating section 115, retransmission packet receiving section 116, data storing section 117, and packet transmitting section 118.

Packet receiving section 110 receives a packet from communication network 200. Then packet receiving section 110 passes the received packet to packet check section 111.

Packet check section 111 determines the type of packet received by packet receiving section 110. Then packet check section 111 passes the packet to an output destination according to the packet type.

Packet types will now be described. Packet types include, for example, data packets, retransmission request packets, and retransmission packets. A data packet is an explicit multicast packet created by a transmitting node, in which data to be distributed to a receiving node is stored. A retransmission request packet is a unicast packet created by a receiving node (communication terminal apparatus) that has detected the occurrence of a packet loss, in which information necessary for requesting retransmission of a data packet for which a packet loss occurred is stored. A retransmission packet is a unicast packet created by a receiving node (communication terminal apparatus) that has received a retransmission request packet, in which retransmission data requested by a retransmission request packet is stored.

Returning to the description of packet check section 111, if packet check section 111 determines a received packet to be a data packet, it passes that packet to packet loss detecting section 112. If packet check section 111 determines a received packet to be a retransmission request packet, it passes that packet to retransmission packet creating section 115. And if packet check section 111 determines a received packet to be a retransmission packet, it passes that packet to retransmission packet receiving section 116.

Packet loss detecting section 112 determines whether or not a packet loss has occurred in a series of data packets received by packet receiving section 110. For example, packet loss detecting section 112 can detect the occurrence of a packet loss by checking a sequence number entered in the header section of a data packet.

Figure 3:
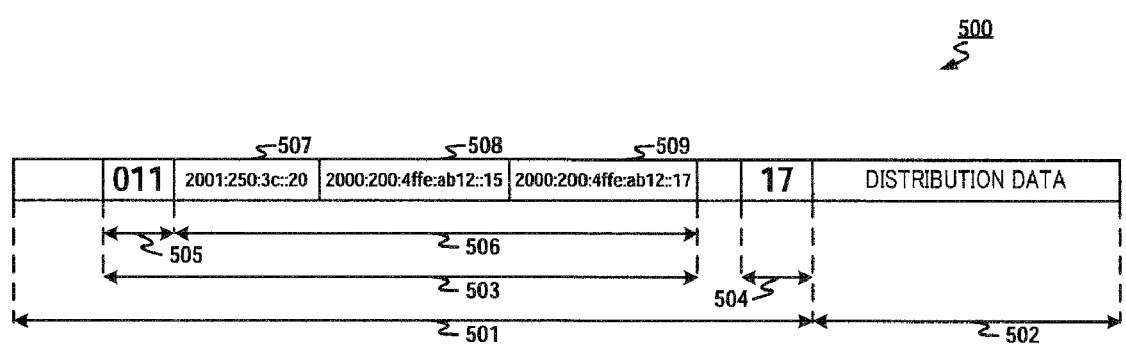
FIG. 3 is a drawing showing an example of the configuration of a data packet.

Sequence numbers in data packets will now be described. FIG. 3 is a drawing showing an example of the configuration of an explicit multicast data packet. In FIG. 3, data packet 500 has header section 501 and payload 502 containing distribution data. Header section 501 contains routing header 503 (described later herein) and sequence number 504. In the data packet example shown in FIG. 3, sequence number 504 is integer "17". Header section 501 may also have other headers, but these are not described here for convenience of description.

Returning to the description of packet loss detecting section 112, when packet loss detecting section 112 receives data packets with consecutive sequence numbers, it determines that a packet loss has not occurred. On the other hand, when packet loss detecting section 112 receives data packets with nonconsecutive sequence numbers, it determines that a packet loss has occurred. For example, if the sequence number of a data packet received at a certain point in time is "15", and the sequence number of the data packet received next is "16", packet loss detecting section 112 determines that a packet loss has not occurred. On the other hand, if the sequence number of a data packet received at a certain point in time is "15", and the sequence number of the data packet received next is "17", packet loss detecting section 112 determines that a packet loss has occurred in a data packet with sequence number "16". On determining that a packet loss has occurred, packet loss detecting section 112 reports the sequence number of the data packet for which a packet loss has occurred (in the above example, "16") to retransmission request destination selecting section 113 in order to have the data packet for which the packet loss occurred retransmitted from another receiving node. At the same time, packet loss detecting section 112 passes a stored (last received) data packet (in the above example, a data packet with sequence number "17") to retransmission request destination selecting section 113. Packet loss detecting section 112 also stores data contained in a data packet passed from packet check section 111 in data storing section 117. At this time, packet loss detecting section 112 stores the sequence number corresponding to the data packet together with the data in an associated fashion for subsequent retransmission processing. Packet loss detecting section 112 may also store a data packet as it is in data storing section 117.

Retransmission request destination selecting section 113 selects a receiving node to which to make a retransmission request for a data packet for which the occurrence of a packet loss has been reported by packet loss detecting section 112. At this time, retransmission request destination selecting section 113 can select a retransmission request destination receiving node by searching a bitmap and address list in the data packet passed from packet loss detecting section 112.

The bitmap and address list in a data packet will now be described. In FIG. 3, routing header 503 of data packet 500 contains bitmap 505, which is a bit sequence indicating whether or not distribution has been completed, and address list 506 containing one or more IP addresses of receiving nodes that are transmission destinations. In the data packet example shown in FIG. 3, address list 506 contains receiving node A IP address 507, receiving node C IP address 508, and receiving node D IP address 509. Also, in bitmap 505, one bit is assigned to each of IP addresses 507 through 509 in address list 506, in that order. In the data packet example shown in FIG. 3, the bitmap is "0·1·1", with a 0 bit indicating completion of distribution and a 1 bit indicating that distribution has not been performed, signifying that receiving node A is a receiving node for which distribution has been completed (0), receiving node C is a receiving node for which distribution has not been performed (1), and receiving node D is also a receiving node for which distribution has not been performed (1).

Returning to the description of retransmission request destination selecting section 113, retransmission request destination selecting section 113 looks at the bitmap in the data packet passed from packet loss detecting section 112, and selects one bit indicating that distribution has been completed (in the above example, a 0 bit). Then retransmission request destination selecting section 113 checks the address list of the same data packet, and acquires the IP address of the receiving node corresponding to the chosen bit. There are no particular restrictions on the method (criterion) whereby retransmission request destination selecting section 113 selects a bit indicating completion of distribution, and any bit may be selected as long as it is a bit indicating completion of distribution. For example, if the transmitting node enters receiving node IP addresses in the address list so that receiving nodes that are close in the network are adjacent, retransmission request destination selecting section 113 may preferentially select a "distribution-completed" bit near the bit corresponding to the transmitting node. Retransmission request destination selecting section 113 may also select a "distribution-completed" bit randomly from a plurality of bits indicating completion of distribution so that a large number of retransmission requests are not concentrated in one receiving node. Furthermore, if retransmission request destination selecting section 113 has acquired information relating to the performance of each receiving node from the transmitting node, it may select a distribution-completed receiving node with higher performance. If there is no distribution-completed receiving node, retransmission request destination selecting section 113 selects the transmitting node. In the case of the data packet shown in FIG. 3, for example, the only distribution-completed receiving node for which bitmap 505 is 0 is receiving node A, and therefore retransmission request destination selecting section 113 selects receiving node A IP address 507 as the retransmission request destination.

Retransmission request destination selecting section 113 reports the receiving node IP address selected as the retransmission request destination, and the sequence number of a data packet for which a packet loss occurred, to retransmission request packet creating section 114. Retransmission request destination selecting section 113 also records the sequence number of a data packet for which a retransmission request is made. For example, retransmission request destination selecting section 113 can enter the sequence number of a data packet for which a retransmission request is made in a "table of sequence numbers for which a retransmission request is (has been) made" stored in data storing section 117.

Figure 4:
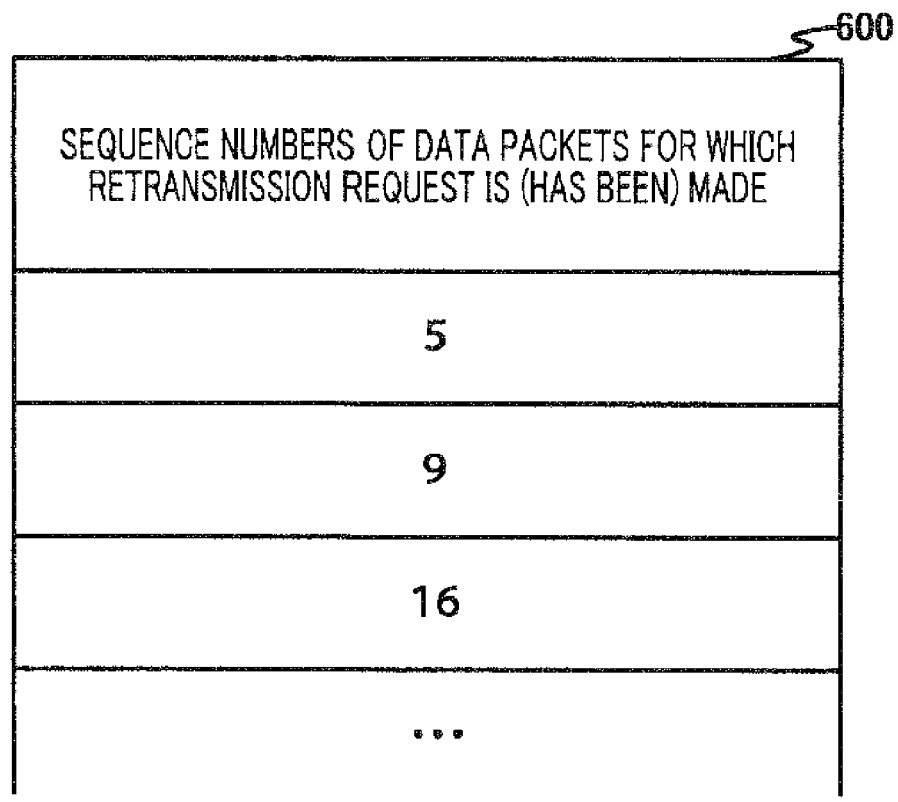
FIG. 4 is a drawing showing a table containing sequence numbers of data packets for which a retransmission request is (has been) made.

FIG. 4 is a drawing showing an example of a "table of sequence numbers for which a retransmission request is (has been) made". This table 600 is an example in which the fact that a retransmission request has been made for data packets with sequence numbers 5, 9, and 16 is recorded. This table is used by retransmission packet receiving section 116 described later herein.

Retransmission request packet creating section 114 creates a retransmission request packet containing the retransmission request destination receiving node IP address selected by retransmission request destination selecting section 113 and the sequence number of a data packet for which retransmission is requested.

Figure 5A:
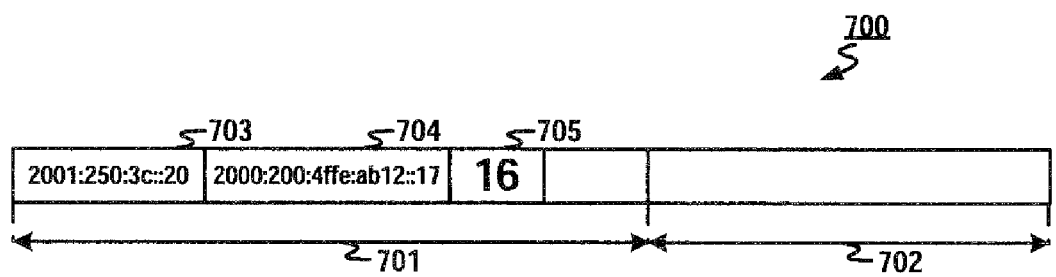
FIG. 5A is a drawing showing an example of the configuration of a retransmission request packet.
Figure 5B:
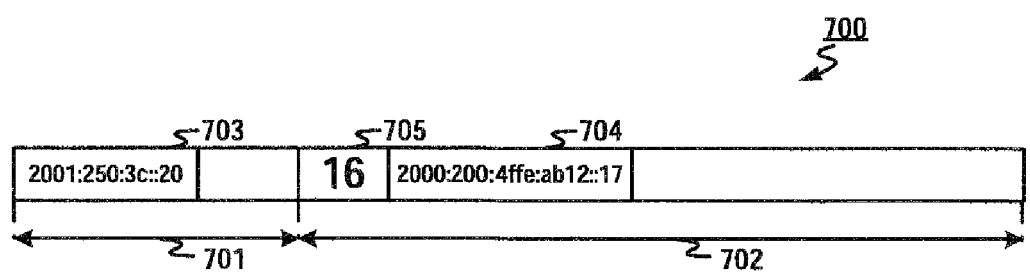
FIG. 5B is a drawing showing another example of the configuration of a retransmission request packet.

A retransmission request packet will now be described. FIGS. 5A and 5B are drawings showing examples of the configuration of a retransmission request packet. In FIG. 5A, retransmission request packet 700 has header section 701 and payload 702. Header section 701 contains destination address 703, retransmission request source address 704, and retransmission-requested data packet sequence number 705. Header section 701 may also have other headers, but these are not described here for convenience of description.

Returning to the description of retransmission request packet creating section 114, retransmission request packet creating section 114 enters the retransmission request destination image processing apparatus selected by retransmission request destination selecting section 113 (in the example shown in FIG. 5A, the IP address of receiving node A) in destination address 703 of header section 701. Retransmission request packet creating section 114 also enters its IP address (in the example shown in FIG. 5A, the IP address of receiving node C) in retransmission request source address 704, and enters the sequence number reported from retransmission request destination selecting section 113 in retransmission-requested data packet sequence number 705. Retransmission request packet creating section 114 may also enter retransmission request source address 704 and retransmission-requested data packet sequence number 705 in payload 702, as shown in FIG. 5B. Retransmission request packet creating section 114 then passes the created retransmission request packet to packet transmitting section 118.

Retransmission packet creating section 115 acquires the retransmission request source address and the sequence number of the data packet for which retransmission has been requested contained in the retransmission request packet passed from packet check section 111. Retransmission packet creating section 115 then determines whether or not data of the acquired sequence number has been stored in data storing section 117. If retransmission packet creating section 115 determines that the data for which retransmission has been requested is stored in data storing section 117, it creates a retransmission packet based on the acquired retransmission request source address and sequence number.

Figure 6:
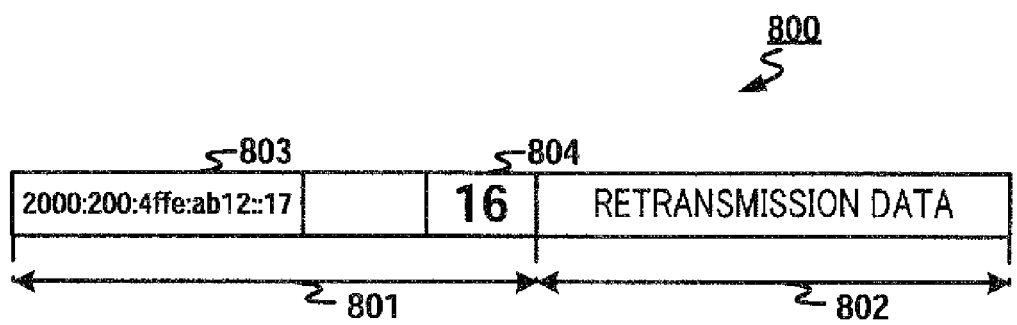
FIG. 6 is a drawing showing an example of the configuration of a retransmission packet.

A retransmission packet will now be described. FIG. 6 is a drawing showing an example of the configuration of a retransmission packet. In FIG. 6, retransmission packet 800 has header section 801 and payload 802 containing retransmission data. Header section 801 contains destination address 803 and retransmission-requested data packet sequence number 804. Header section 801 may also have other headers, but these are not described here for convenience of description.

Returning to the description of retransmission packet creating section 115, retransmission packet creating section 115 enters the retransmission request source address entered in the retransmission request packet in destination address 803, and enters the sequence number entered in the retransmission request packet in sequence number 804. Retransmission packet creating section 115 also stores data corresponding to that sequence number in payload 802 as retransmission data. Retransmission packet creating section 115 then passes the created retransmission packet to packet transmitting section 118.

Retransmission packet receiving section 116 acquires the sequence number contained in the retransmission packet passed from packet check section 111. Then retransmission packet receiving section 116 determines whether or not the acquired sequence number has been entered in the table of sequence numbers for which a retransmission request has been made stored in data storing section 117 (see FIG. 4) If retransmission packet receiving section 116 determines that the acquired sequence number has been entered in the table, it determines the retransmission data of the retransmission packet to be data for which retransmission has been requested, and stores that data in data storing section 117. On the other hand, if retransmission packet receiving section 116 determines that the acquired sequence number has not been entered in the table, it determines the retransmission data of the retransmission packet to be data for which retransmission has not been requested, and discards the retransmission packet.

Data storing section 117 is a storage section that stores data and a sequence number contained in a data packet or retransmission packet. Data storing section 117 also stores the table of sequence numbers for which a retransmission request has been made.

Packet transmitting section 118 transmits a retransmission request packet created by retransmission request packet creating section 114 and a retransmission packet created by retransmission packet creating section 115 to communication network 200.

The operation of communication terminal apparatus 100 configured as described above will now be explained.

Figure 7:
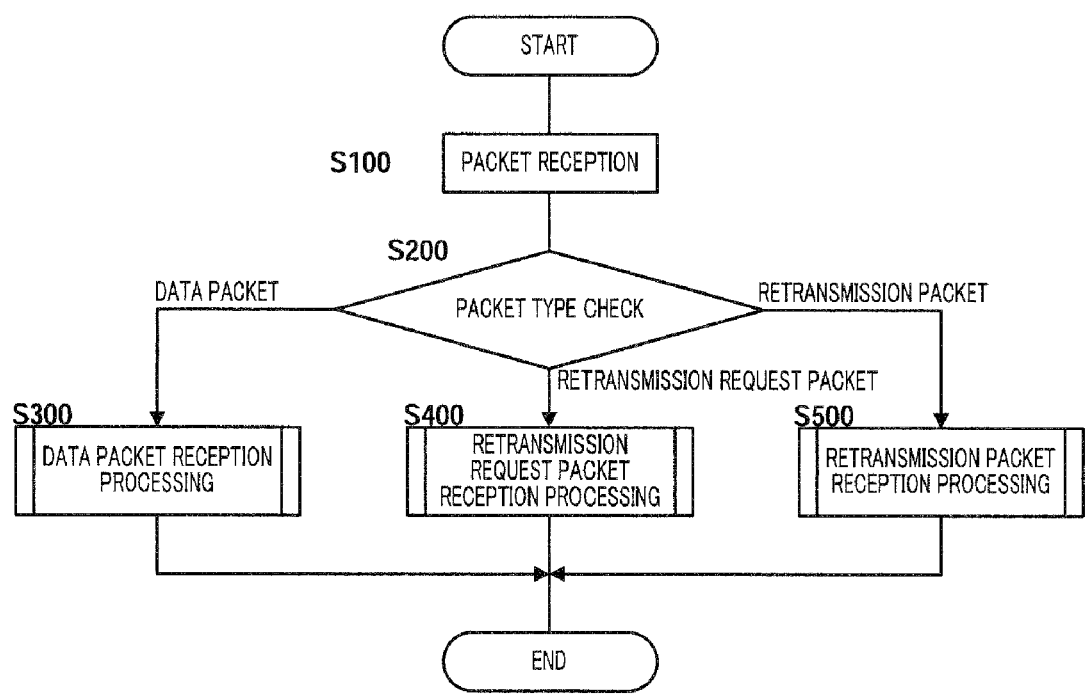
FIG. 7 is a flowchart showing operation at the time of packet reception by a communication terminal apparatus according to Embodiment 1 of the present invention.

FIG. 7 is a flowchart showing the operation of communication terminal apparatus 100 when a packet is received.

First, in step S100, packet receiving section 110 receives a packet from communication network 200. Then packet receiving section 110 passes the received packet to packet check section 111.

Next, in step S200, packet check section 111 determines the type of packet received by packet receiving section 110. Then, if packet check section 111 determines the received packet to be a data packet (S200: DATA PACKET), it passes that packet to packet loss detecting section 112, and proceeds to step S300. If packet check section 111 determines the received packet to be a retransmission request packet (S200: RETRANSMISSION REQUEST PACKET), it passes that packet to retransmission packet creating section 115, and proceeds to step S400. If packet check section 111 determines the received packet to be a retransmission packet (S200: RETRANSMISSION PACKET), it passes that packet to retransmission packet receiving section 116, and proceeds to step S500.

In step S300, data packet reception processing is performed, and this processing flow is terminated. Data packet reception processing is normally processing that stores a data packet in data storing section 117. However, if a packet loss occurs in the data packet being received, data packet reception processing becomes processing that makes a retransmission request to another specific receiving node for the lost data. Data packet reception processing will be described later herein using FIG. 8.

In step S400, retransmission request packet reception processing is performed, and this processing flow is terminated. Retransmission request packet reception processing is processing that transmits data for which retransmission has been requested by means of a retransmission request packet to the retransmission request source. Retransmission request packet reception processing will be described later herein using FIG. 9.

In step S500, retransmission packet reception processing is performed, and this processing flow is terminated. Retransmission packet reception processing is normally processing that stores retransmission packet data in data storing section 117. Retransmission packet reception processing will be described later herein using FIG. 10.

Figure 8:
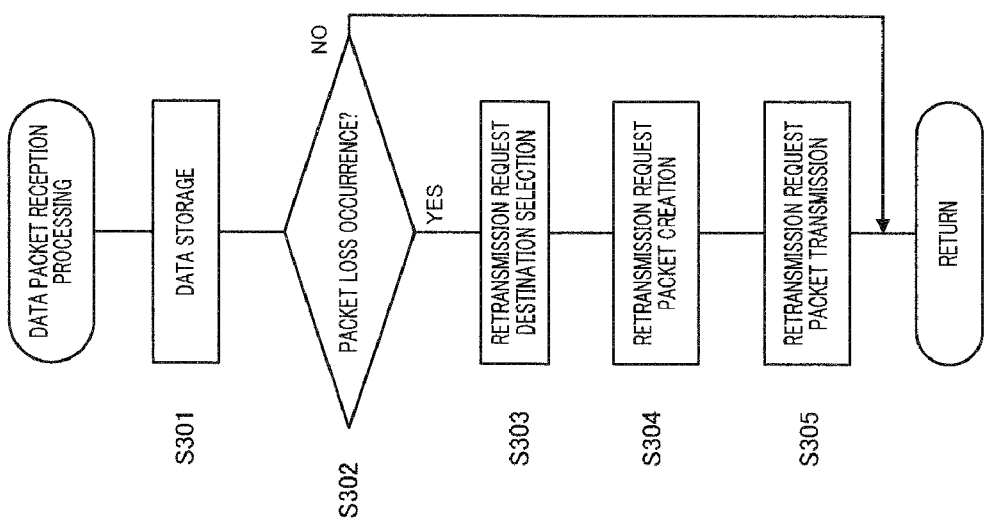
FIG. 8 is a flowchart showing data packet reception processing according to Embodiment 1 of the present invention.

Data packet reception processing (step S300) will now be described using the flowchart shown in FIG. 8.

First, in step S301, packet loss detecting section 112 stores data contained in a data packet passed from packet check section 111 (or the entire data packet) in data storing section 117.

Next, in step S302, packet loss detecting section 112 determines whether or not a packet loss has occurred. If packet loss detecting section 112 determines that a packet loss has not occurred (S302: NO), it terminates this processing flow. On the other hand, if packet loss detecting section 112 determines that a packet loss has occurred (S302: YES), it passes the sequence number of the data packet for which the packet loss occurred, and the stored (last received) data packet, to retransmission request destination selecting section 113, and proceeds to step S303.

In step S303, retransmission request destination selecting section 113 selects a receiving node to be made the retransmission request destination from the bitmap and address list of the data packet passed from packet loss detecting section 112. Retransmission request destination selecting section 113 also enters the sequence number of the data packet for which a retransmission request is to be made in a table stored in data storing section 117. Then retransmission request destination selecting section 113 reports the IP address of the selected retransmission request destination receiving node, and the sequence number of the data packet for which a retransmission request is to be made, to retransmission request packet creating section 114.

Next, in step S304, retransmission request packet creating section 114 creates a unicast retransmission request packet from the IP address and sequence number reported by retransmission request destination selecting section 113. Retransmission request packet creating section 114 then passes the created retransmission request packet to packet transmitting section 118.

Then, in step S305, packet transmitting section 118 transmits the retransmission request packet created by retransmission request packet creating section 114 to the retransmission request destination receiving node, and terminates this processing flow.

Figure 9:
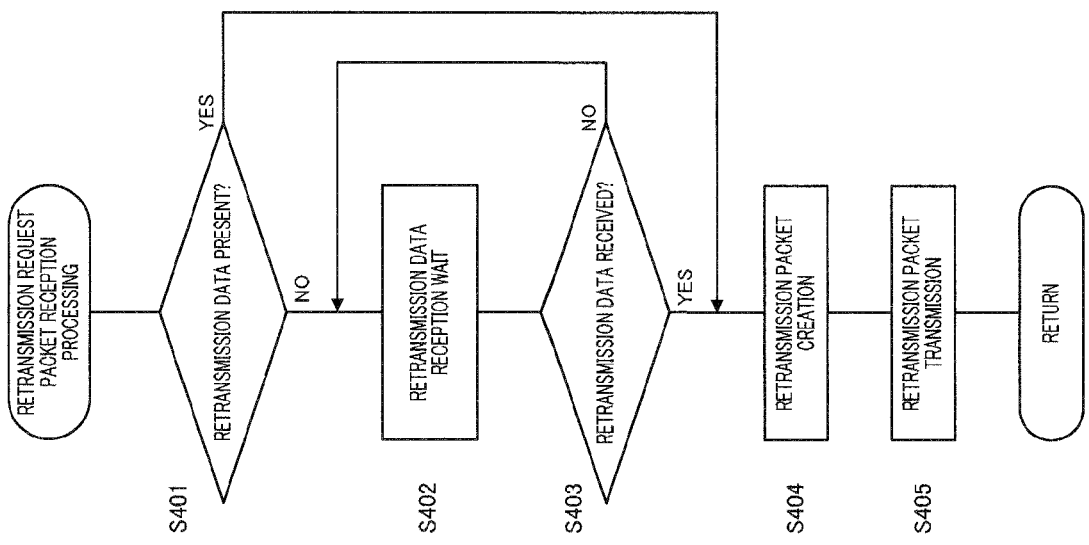
FIG. 9 is a flowchart showing retransmission request packet reception processing according to Embodiment 1 of the present invention.

Retransmission request packet reception processing (step S400) will now be described using the flowchart shown in FIG. 9.

First, in step S401, retransmission packet creating section 115 acquires the sequence number of the data packet for which retransmission has been requested contained in the retransmission request packet passed from packet check section 111. Then retransmission packet creating section 115 determines whether or not data of that sequence number has been stored in data storing section 117. If retransmission packet creating section 115 determines that the data has been stored in data storing section 117 (S401: YES), it proceeds to step S404. On the other hand, if retransmission packet creating section 115 determines that the data has not been stored (S401: NO), it proceeds to step S402.

In step S402, retransmission packet creating section 115 waits for an arbitrary time period in order to receive the data packet for which retransmission has been requested.

Next, in step S403, retransmission packet creating section 115 again determines whether or not data of the data packet for which retransmission has been requested has been stored in data storing section 117. If retransmission packet creating section 115 determines that the data has been stored in data storing section 117 (S403: YES), it proceeds to step S404. On the other hand, if retransmission packet creating section 115 determines that the data has not been stored in data storing section 117 (S403: NO), it returns to step S402. Thus, retransmission packet creating section 115 repeats step S402 and step S403 until data of the data packet for which retransmission has been requested is stored in data storing section 117.

In step S404, retransmission packet creating section 115 creates a retransmission packet. At this time, retransmission packet creating section 115 takes the retransmission request source address entered in the retransmission request packet as the retransmission packet destination address. Retransmission packet creating section 115 also stores the sequence number entered in the retransmission request packet, and data corresponding to that sequence number, in the retransmission packet. Retransmission packet creating section 115 then passes the created retransmission packet to packet transmitting section 118.

Next, in step S405, packet transmitting section 118 transmits the retransmission packet created by retransmission packet creating section 115 to the retransmission request source receiving node (communication terminal apparatus), and terminates this processing flow.

Figure 10:
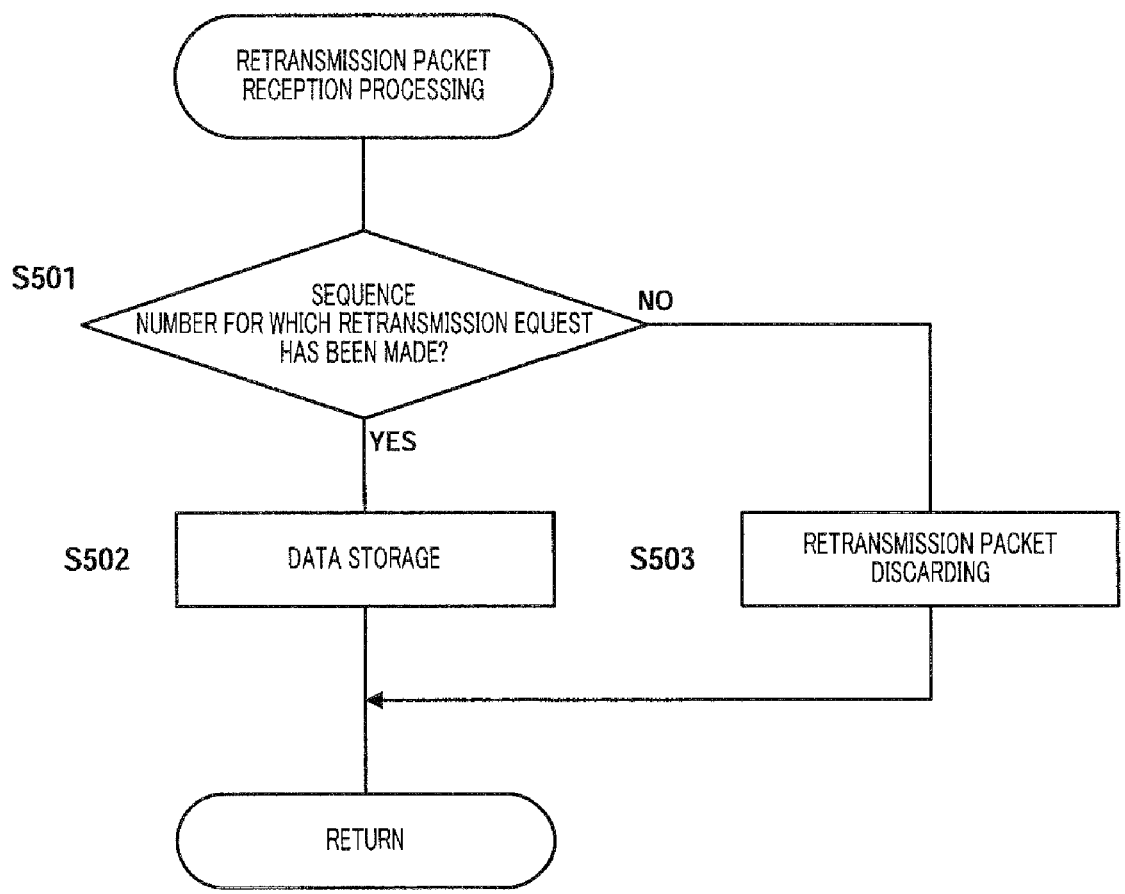
FIG. 10 is a flowchart showing retransmission packet reception processing according to Embodiment 1 of the present invention.

Retransmission packet reception processing (step S500) will now be described using the flowchart shown in FIG. 10.

First, in step S501, retransmission packet receiving section 116 acquires the sequence number contained in the retransmission packet. Then retransmission packet receiving section 116 determines whether or not the same sequence number has been entered in the table of sequence numbers for which a retransmission request has been made stored in data storing section 117. If retransmission packet receiving section 116 determines that the same sequence number has been entered (S501: YES), it proceeds to step S502. On the other hand, if retransmission packet receiving section 116 determines that the same sequence number has not been entered (S501: NO), it proceeds to step S503.

In step S502, retransmission packet receiving section 116 stores data of the received retransmission packet in data storing section 117. Then retransmission packet receiving section 116 deletes the sequence number of the data packet for which retransmission has been requested from the table of sequence numbers of data packets for which a retransmission request has been made, and terminates this processing flow.

In step S503, retransmission packet receiving section 116 discards the received retransmission packet and terminates this processing flow.

Lastly, the operation of communication terminal apparatuses 100a through 100e in communication network 200 will be described using FIG. 1. For convenience of description, transmitting node 300 will be assumed to distribute the same data packet to receiving node A 100a, receiving node C 100c, and receiving node D 100d. Also, routers 400 through 402 will be assumed to be compatible with an explicit multicast method.

First, transmitting node 300 creates a data packet containing the IP addresses of receiving node A 100a, receiving node C 100c, and receiving node D 100d in an address list. It will be assumed here that transmitting node 300 creates the data packet shown in FIG. 3 (with "111" as the value of bitmap 505). Transmitting node 300 then transmits the created data packet to router 400.

On receiving the data packet from transmitting node 300, router 400 checks the transmission interface for the IP addresses of receiving node A 100a, receiving node C 100c, and receiving node D 100d. In this case, router 400 transmits a data packet to receiving node A 100a and router 401. Router 400 duplicates the data packet a number of times (that is, two) equivalent to the number of transfer destination interfaces. Then router 400 transmits the duplicated data packets to receiving node A 100a and router 401. At this time, router 400 sets bits corresponding to the receiving node C 100c IP address and receiving node D 100d IP address to "distribution-completed" in the bitmap of the data packet transmitted to receiving node A 100a (that is, bitmap 505 becomes "100"). Similarly, router 400 sets a bit corresponding to the receiving node A 100a IP address to "distribution-completed" in the bitmap of the data packet transmitted to router 401 (that is, bitmap 505 becomes "011").

Receiving node A 100a stores the data and sequence number of the data packet received from router 400 in data storing section 117 (normal data packet reception processing).

In the same way as router 400 above, router 401 transmits data packets to receiving node C 100c and router 402 (with bitmap 505 as "010" and "001" respectively) (multicast communication).

Receiving node C 100c stores the data and sequence number of the data packet received from router 401 in data storing section 117 (normal data packet reception processing).

Router 402 transmits a data packet to receiving node D 100d, but it will be assumed here that a packet loss occurs between router 402 and receiving node D 100d.

Receiving node D 100d detects the fact that a packet loss has occurred in the data packet received from transmitting node 300. Receiving node D 100d checks the bitmap ("001") and address list of the next data packet (for example, sequence number "17") received after the data packet for which the packet loss occurred (for example, sequence number "16"). Then receiving node D 100d creates a retransmission request packet with a receiving node for which distribution of this data packet (sequence number "17") has been completed as the retransmission request destination. It will be assumed here that receiving node D 100d selects receiving node A 100a as the retransmission request destination receiving node, and creates the retransmission request packet shown in FIG. 5A. Receiving node D 100d then transmits the created retransmission request packet to router 402 (data packet reception processing in the case of packet loss occurrence).

Router 402 transmits the received retransmission request packet to router 401 (unicast communication).

Router 401 transmits the received retransmission request packet to router 400 (unicast communication).

Router 400 transmits the received retransmission request packet to receiving node A 100a (unicast communication).

Receiving node A 100a acquires the sequence number (for example, "16") and retransmission request source address (receiving node D IP address) contained in the retransmission request packet received from router 400. Then receiving node A 100a creates a retransmission packet storing retransmission data, with receiving node D 100d as the transmission destination. It will be assumed here that receiving node A 100a creates the retransmission packet shown in FIG. 6. Receiving node A 100a transmits the created retransmission packet to router 400 (retransmission request packet reception processing).

Router 400 transmits the received retransmission packet to router 401 (unicast communication).

Router 401 transmits the received retransmission packet to router 402 (unicast communication).

Router 402 transmits the received retransmission packet to receiving node D 100d (unicast communication).

Receiving node D 100d stores the retransmission data and sequence number contained in the retransmission packet received from router 402 in the data storing section (retransmission packet reception processing).

As described above, a communication terminal apparatus according to Embodiment 1 selects the IP address of a receiving node to which a retransmission request is made from a bitmap and address list contained in the header of a received data packet, and makes a retransmission request to the selected receiving node by means of unicast communication. Therefore, if a packet loss occurs at a certain receiving node in a group, retransmission request packet reception processing is not performed by all receiving nodes as in the case of a conventional method, but is performed only by the selected receiving node. Thus, a communication terminal apparatus according to Embodiment 1 can make a retransmission request without imposing a load on a band of an entire network and another receiving node.

Embodiment 2

In Embodiment 1, an example was shown in which, when a retransmission request packet is received from a certain receiving node, a retransmission packet is created immediately. In Embodiment 2, an example is shown in which, when a retransmission request packet is received from a certain receiving node, a retransmission packet is created after waiting for a fixed time period in order to receive a retransmission request packet for the same data from another receiving node.

Figure 11:
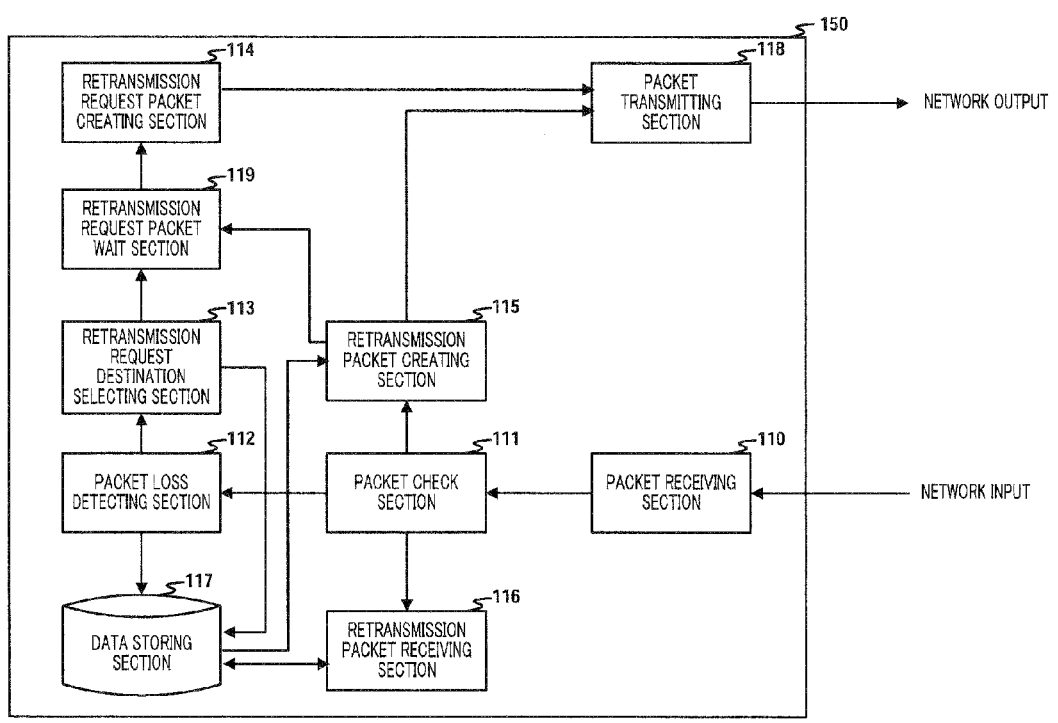
FIG. 11 is a block diagram showing the configuration of a communication terminal apparatus according to Embodiment 2 of the present invention.

FIG. 11 is a drawing showing the configuration of a communication terminal apparatus according to Embodiment 2 of the present invention. Configuration elements identical to those of a communication terminal apparatus according to Embodiment 1 are assigned the same reference codes as in Embodiment 1, and duplicate descriptions are omitted.

In FIG. 11, communication terminal apparatus 150 is equipped with retransmission request packet wait section 119 in addition to the configuration of communication terminal apparatus 100 in FIG. 2. Configuration elements other than retransmission request destination selecting section 113, retransmission request packet wait section 119, retransmission request packet creating section 114, and retransmission packet creating section 115 are the same as in Embodiment 1, and are therefore not described here.

Retransmission request destination selecting section 113 selects the IP address of a retransmission request destination receiving node in the same way as a retransmission request destination selecting section of Embodiment 1. Then retransmission request destination selecting section 113 reports the IP address of the receiving node selected as a retransmission request destination, and the sequence number of a data packet for which a packet loss has occurred, to retransmission request packet wait section 119.

After the IP address of the retransmission request destination receiving node and the sequence number of the data packet for which a packet loss has occurred have been reported by retransmission request destination selecting section 113, retransmission request packet wait section 119 waits for a predetermined time period in order to receive a retransmission request packet requesting retransmission of data with the same sequence number (retransmission request packet reception wait state). Then retransmission request packet wait section 119 reports the IP address of the retransmission request destination receiving node and the sequence number of the data packet for which a packet loss occurred, reported by retransmission request destination selecting section 113, to retransmission request packet creating section 114. At this time, if a retransmission request packet requesting retransmission of data with the same sequence number has been passed from retransmission packet creating section 115 during the wait period, retransmission request packet wait section 119 also reports the IP address of the retransmission request source entered in that retransmission packet to retransmission request packet creating section 114.

In addition to performing the functions of a retransmission request packet creating section of Embodiment 1, if a plurality of retransmission request source IP addresses are reported by retransmission request packet wait section 119, retransmission request packet creating section 114 also enters the plurality of retransmission request source IP addresses in a retransmission request packet as retransmission request source addresses.

Figure 12:
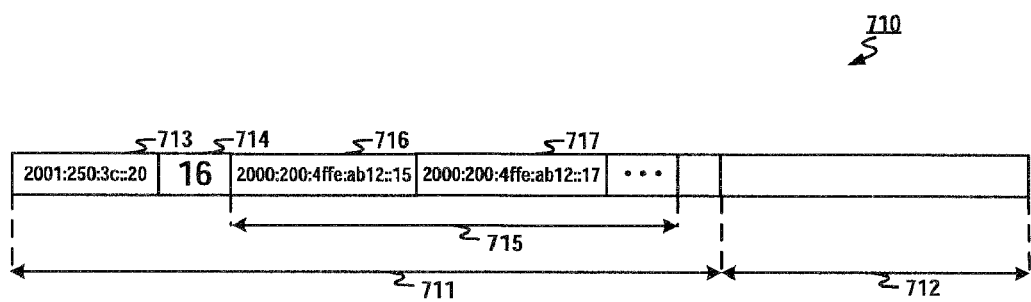
FIG. 12 is a drawing showing an example of the configuration of a retransmission request packet in which a plurality of retransmission source IP addresses have been entered.

A retransmission request packet in which a plurality of retransmission request source IP addresses have been entered will now be described. FIG. 12 is a drawing showing an example of the configuration of a retransmission request packet in which a plurality of retransmission source IP addresses have been entered. In FIG. 12, retransmission request packet 710 has header section 711 and payload 712. Header section 711 contains destination address 713, retransmission-requested data packet sequence number 714, and retransmission request source receiving node IP addresses 716 and 717. Header section 711 may also have other headers, but these are not described here for convenience of description.

Returning to the description of retransmission request packet creating section 114, if a plurality of retransmission request source IP addresses are reported by retransmission request packet wait section 119, retransmission request packet creating section 114 creates a unicast retransmission request packet with all the retransmission request source IP addresses entered in the address list.

In addition to performing the functions of a retransmission packet creating section of Embodiment 1, retransmission packet creating section 115 also creates an explicit multicast retransmission packet.

Figure 13:
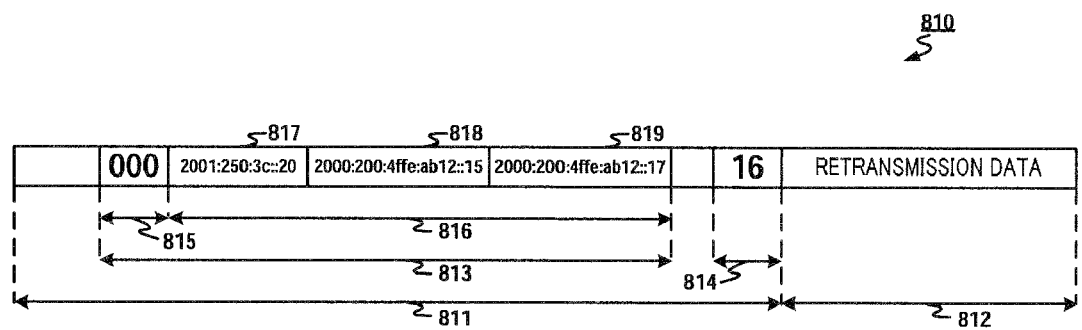
FIG. 13 is a drawing showing an example of the configuration of an explicit multicast retransmission packet.

An explicit multicast retransmission packet will now be described. FIG. 13 is a drawing showing an example of the configuration of an explicit multicast retransmission packet. In FIG. 13, retransmission packet 810 has header section 811 and payload 812 containing retransmission data. Header section 811 contains routing header 813 and sequence number 814. Routing header 813 contains bitmap 815 indicating whether or not distribution has been completed, and address list 816 containing one or more IP addresses of receiving nodes that are retransmission destinations. Header section 811 may also have other headers, but these are not described here for convenience of description.

Returning to the description of retransmission packet creating section 115, when a retransmission request packet containing a plurality of retransmission request source IP addresses is received, retransmission packet creating section 115 creates an explicit multicast retransmission packet in which all the retransmission request source IP addresses are entered in the address list. Also, if a retransmission request packet is passed from packet check section 111 while retransmission request packet wait section 119 is in the retransmission request packet reception wait state, retransmission packet creating section 115 passes the passed retransmission request packet to retransmission request packet wait section 119.

The operation of communication terminal apparatus 150 configured as described above will now be explained.

On receiving a packet, communication terminal apparatus 150 performs data packet reception processing, retransmission request packet reception processing, or retransmission packet reception processing, according to the type of packet received. This operation is the same as in Embodiment 1, and is therefore not described here (see FIG. 7).

Data packet reception processing and retransmission request packet reception processing, which differ from Embodiment 1, will now be described. Retransmission packet reception processing is the same as in Embodiment 1, and is therefore not described here.

Figure 14:
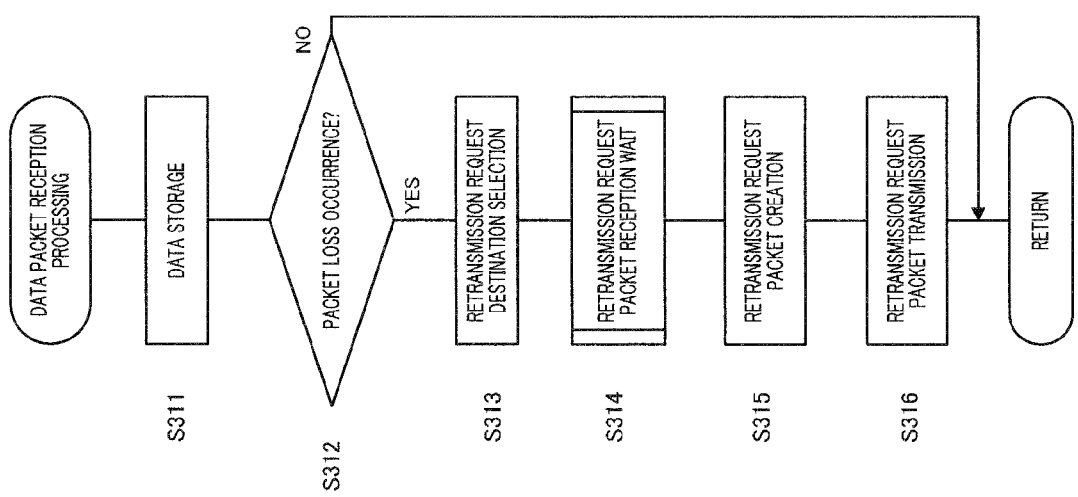
FIG. 14 is a flowchart showing data packet reception processing according to Embodiment 2 of the present invention.

Data packet reception processing (step S300) will first be described using the flowchart shown in FIG. 14.

First, in step S311, packet loss detecting section 112 stores data contained in a data packet passed from packet check section 111 (or the entire data packet) in data storing section 117.

Next, in step S312, packet loss detecting section 112 determines whether or not a packet loss has occurred. If packet loss detecting section 112 determines that a packet loss has not occurred (S312: NO), it terminates this processing flow. On the other hand, if packet loss detecting section 112 determines that a packet loss has occurred (S312: YES), it passes the sequence number of the data packet for which the packet loss occurred, and the stored (last received) data packet, to retransmission request destination selecting section 113, and proceeds to step S313.

In step S313, retransmission request destination selecting section 113 selects a receiving node to be made the retransmission request destination from the bitmap and address list of the data packet passed from packet loss detecting section 112. Retransmission request destination selecting section 113 also records the sequence number of the data packet for which a retransmission request is to be made in a table stored in data storing section 117. Then retransmission request destination selecting section 113 reports the IP address of the selected retransmission request destination receiving node, and the sequence number of the data packet for which a retransmission request is to be made, to retransmission request packet wait section 119.

Next, in step S314, after the IP address of the retransmission request destination receiving node and the sequence number of the data packet for which a packet loss has occurred have been reported by retransmission request destination selecting section 113, retransmission request packet wait section 119 waits for a predetermined time period until it receives a retransmission request packet requesting retransmission of data with the same sequence number (retransmission request packet reception wait processing). Retransmission request packet reception wait processing will be described later herein using FIG. 15. After the retransmission request packet reception wait processing, retransmission request packet wait section 119 reports the IP address of the retransmission request destination receiving node and the sequence number of the data packet for which a packet loss occurred, reported by retransmission request destination selecting section 113, to retransmission request packet creating section 114. Furthermore, if a retransmission request packet requesting retransmission of data with the same sequence number has been passed from retransmission packet creating section 115 during the wait period, retransmission request packet wait section 119 also reports the IP address of the retransmission request source contained in that retransmission request packet to retransmission request packet creating section 114.

Next, in step S315, retransmission request packet creating section 114 creates a retransmission request packet from an IP address and sequence number reported by retransmission request packet wait section 119. At this time, if a plurality of retransmission request source IP addresses have been reported by retransmission request packet wait section 119, retransmission request packet creating section 114 enters all the retransmission request source IP addresses as retransmission request source addresses. Retransmission request packet creating section 114 then passes the created retransmission request packet to packet transmitting section 118.

Then, in step S316, packet transmitting section 118 transmits the retransmission request packet created by retransmission request packet creating section 114 to the retransmission request destination receiving node, and terminates this processing flow.

Figure 15:
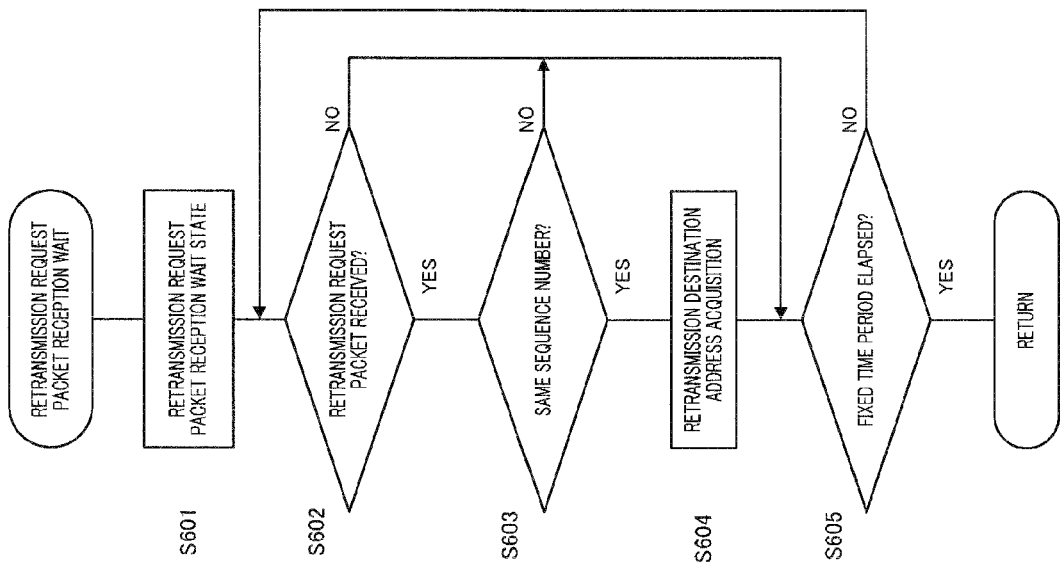
FIG. 15 is a flowchart showing retransmission request packet reception wait processing according to Embodiment 2 of the present invention.

Retransmission request packet reception wait processing (step S314) will now be described using the flowchart shown in FIG. 15.

First, in step S601, after the IP address of the retransmission request destination receiving node and the sequence number of the data packet for which a packet loss has occurred have been reported by retransmission request destination selecting section 113, retransmission request packet wait section 119 transits to a retransmission request packet reception wait state.

Next, in step S602, retransmission request packet wait section 119 determines whether or not it has received a retransmission request packet from retransmission packet creating section 115. If retransmission request packet wait section 119 determines that a retransmission request packet has been received (S602: YES), it proceeds to step S603. On the other hand, if retransmission request packet wait section 119 determines that a retransmission request packet has not been received (S602: NO), it proceeds to step S605.

In step S603, retransmission request packet wait section 119 determines whether or not the sequence number of the data packet for which retransmission has been requested contained in the retransmission request packet received from retransmission packet creating section 115 is the same as the sequence number of a data packet for which a packet loss has been detected by packet loss detecting section 112. If retransmission request packet wait section 119 determines that the two sequence numbers are the same (S603: YES), it proceeds to step S604. On the other hand, if retransmission request packet wait section 119 determines that the two sequence numbers are not the same (S603: NO), it proceeds to step S605.

In step S604, retransmission request packet wait section 119 acquires all the retransmission request source addresses contained in the retransmission request packet received from retransmission packet creating section 115.

In step S605, retransmission request packet wait section 119 determines whether or not a fixed time period has elapsed after transiting to the retransmission request packet reception wait state. If retransmission request packet wait section 119 determines that the fixed time period has not elapsed (S605: NO), it returns to step S602. On the other hand, if retransmission request packet wait section 119 determines that the fixed time period has elapsed (S605: YES), it reports the retransmission request source addresses acquired in step S604 to retransmission request packet creating section 114, and terminates this processing flow.

Figure 16:
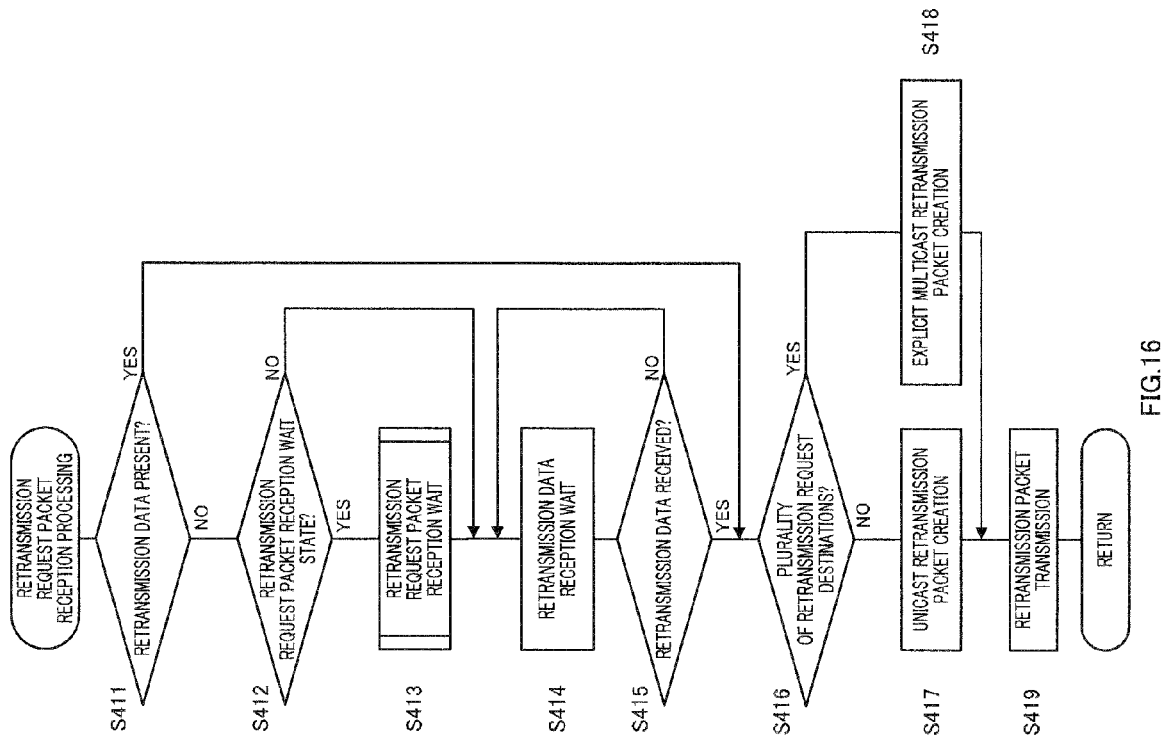
FIG. 16 is a flowchart showing retransmission request packet reception processing according to Embodiment 2 of the present invention.

Retransmission request packet reception processing will now be described using the flow chart shown in FIG. 16.

First, in step S411, retransmission packet creating section 115 acquires the sequence number of the data packet for which retransmission has been requested contained in the retransmission request packet passed from packet check section 111. Then retransmission packet creating section 115 determines whether or not data of that sequence number has been stored in data storing section 117. If retransmission packet creating section 115 determines that the data has not been stored in data storing section 117 (S411: NO), it proceeds to step S412. On the other hand, if retransmission packet creating section 115 determines that the data has been stored (S411: YES), it proceeds to step S416.

In step S412, retransmission packet creating section 115 determines whether or not retransmission request packet wait section 119 is in the retransmission request packet reception wait state. If retransmission packet creating section 115 determines that request packet wait section 119 is in the retransmission request packet reception wait state (S412: YES), it proceeds to step S413. On the other hand, if retransmission packet creating section 115 determines that request packet wait section 119 is not in the retransmission request packet reception wait state (S412: NO), it proceeds to step S414.

In step S413, if a retransmission request packet has been received during the retransmission request packet reception wait state, retransmission packet creating section 115 passes the received retransmission request packet to retransmission request packet wait section 119. Then, when retransmission request packet wait section 119 terminates the retransmission request packet reception wait state, retransmission packet creating section 115 proceeds to step S414.

In step S414, retransmission packet creating section 115 waits for an arbitrary time period in order to receive a retransmission packet of the data packet for which retransmission has been requested.

Next, in step S415, retransmission packet creating section 115 again determines whether or not data of the data packet for which retransmission has been requested has been stored in data storing section 117. If retransmission packet creating section 115 determines that the data has been stored in data storing section 117 (S415: YES), it proceeds to step S416. On the other hand, if retransmission packet creating section 115 determines that the data has not been stored in data storing section 117 (S415: NO), it returns to step S414. Thus, retransmission packet creating section 115 repeats step S414 and step S415 until data of the data packet for which retransmission has been requested is stored in data storing section 117.

In step S416, retransmission packet creating section 115 determines whether or not a plurality of retransmission request source IP addresses have been entered in the retransmission request packet. If retransmission packet creating section 115 determines that there is one retransmission request source IP address (S416: NO), it proceeds to step S417. On the other hand, if retransmission packet creating section 115 determines that there are a plurality of retransmission request source IP addresses (S416: YES), it proceeds to step S418.

In step S417, retransmission packet creating section 115 creates a unicast retransmission packet with the retransmission request source address as the destination address. Retransmission packet creating section 115 then passes the created retransmission packet to packet transmitting section 118.

In step S418, retransmission packet creating section 115 creates an explicit multicast retransmission packet in which all the retransmission request source addresses are entered in the address list. Retransmission packet creating section 115 then passes the created retransmission packet to packet transmitting section 118.

In step S419, packet transmitting section 118 transmits the retransmission packet created by retransmission packet creating section 115 to the retransmission request source receiving node (communication terminal apparatus), and terminates this processing flow.

As described above, if a communication terminal apparatus according to Embodiment 2, when creating a retransmission request packet requesting retransmission of data of a certain sequence number, receives a retransmission request packet requesting retransmission of data of a the same sequence number from another receiving node, it enters not only the node IP address of the communication terminal apparatus, but also the IP address entered as a retransmission request source in that received retransmission request packet, in the retransmission request packet as a retransmission request source. Also, if a communication terminal apparatus according to Embodiment 2 receives a retransmission request packet in which a plurality of retransmission request source addresses are entered, it creates an explicit multicast retransmission packet with all the retransmission request source addresses as destination addresses, and transmits the created retransmission packet. According to this embodiment, in addition to obtaining the effects of Embodiment 1, consumption of the band of an entire network can be further reduced.

Embodiment 3

In Embodiment 1, an example was shown in which, when a packet loss is detected, the IP address of the detecting node is entered in a retransmission request packet as the retransmission request source address. In Embodiment 3, an example is shown in which, when a packet loss is detected, the IP addresses of all distribution-unperformed receiving nodes are entered in a retransmission request packet.

Figure 17:
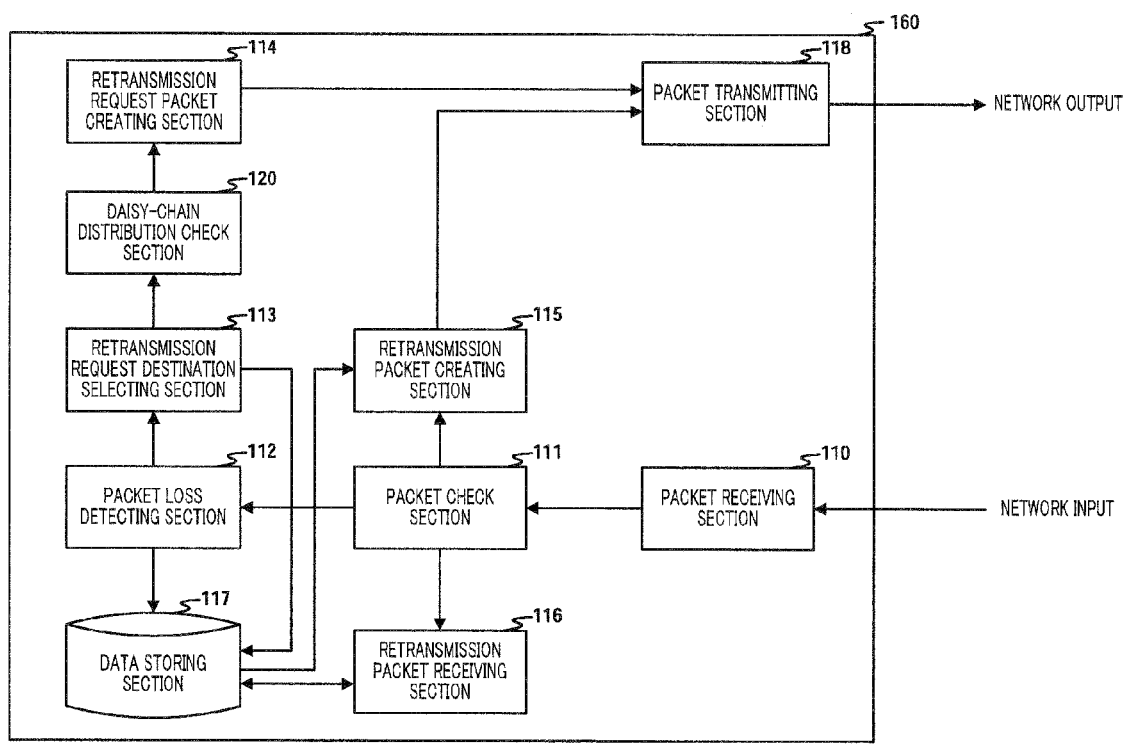
FIG. 17 is a block diagram showing the configuration of a communication terminal apparatus according to Embodiment 3 of the present invention.

FIG. 17 is a drawing showing the configuration of a communication terminal apparatus according to Embodiment 3 of the present invention. Configuration elements identical to those of a communication terminal apparatus according to Embodiment 1 are assigned the same reference codes as in Embodiment 1, and duplicate descriptions are omitted.

In FIG. 17, communication terminal apparatus 160 is equipped with daisy-chain distribution check section 120 in addition to the configuration of communication terminal apparatus 100 in FIG. 2. Configuration elements other than retransmission request destination selecting section 113, daisy-chain distribution check section 120, retransmission request packet creating section 114, and retransmission packet creating section 115 are the same as in Embodiment 1, and are therefore not described here.

Retransmission request destination selecting section 113 selects the IP address of a retransmission request destination receiving node in the same way as a retransmission request destination selecting section of Embodiment 1. Then retransmission request destination selecting section 113 reports the IP address of the receiving node selected as a retransmission request destination, the sequence number of a data packet for which a packet loss has occurred, and a stored (last received) data packet, to daisy-chain distribution check section 120.

Daisy-chain distribution check section 120 determines whether or not the node of communication terminal apparatus 160 has transferred a data packet passed from retransmission request destination selecting section 113 to another receiving node by means of daisy-chain distribution. In order to detect whether or not transfer is being performed by means of daisy-chain distribution, daisy-chain distribution check section 120 may detect whether or not the node of communication terminal apparatus 160 has transferred a received data packet to another receiving node, may determine that daisy-chain distribution is being performed if there is at least one bit indicating non-distribution other than the bit indicate the node of communication terminal apparatus 160 in the bitmap, may inquire of a router whether or not the node of communication terminal apparatus 160 is a receiving node that performs daisy-chaining, or may set a flag indicating whether or not this is a receiving node that performs daisy-chain distribution in a data packet, and detect daisy-chain distribution by checking that flag. If daisy-chain distribution check section 120 determines that transfer is not being performed by means of daisy-chain distribution, it reports the IP address of the retransmission request destination receiving node and the sequence number of the data packet for which a packet loss has occurred, reported by retransmission request destination selecting section 113, to retransmission request packet creating section 114. On the other hand, if daisy-chain distribution check section 120 determines that transfer is being performed by means of daisy-chain distribution, in addition to the IP address of the retransmission request destination receiving node and the sequence number of the data packet for which a packet loss has occurred reported by retransmission request destination selecting section 113, daisy-chain distribution check section 120 also reports to retransmission request packet creating section 114, as a retransmission request source IP address, the IP address entered after the IP address of the node of communication terminal apparatus 160 from among a plurality of IP addresses entered in the address list of the data packet passed from retransmission request destination selecting section 113.

In addition to performing the functions of a retransmission request packet creating section of Embodiment 1, if a plurality of retransmission request source IP addresses are reported by daisy-chain distribution check section 120, retransmission request packet creating section 114 also enters all the retransmission request source IP addresses in a retransmission request packet as retransmission request source addresses.

In addition to performing the functions of a retransmission packet creating section of Embodiment 1, retransmission packet creating section 115 also creates an explicit multicast retransmission packet. When a retransmission request packet in which a plurality of retransmission request source IP addresses have been entered is received, retransmission packet creating section 115 creates an explicit multicast retransmission packet in which all the retransmission request source IP addresses are entered in the address list.

The operation of communication terminal apparatus 160 configured as described above will now be explained.

On receiving a packet, communication terminal apparatus 160 performs data packet reception processing, retransmission request packet reception processing, or retransmission packet reception processing, according to the type of packet received. This operation is the same as in Embodiment 1, and is therefore not described here (see FIG. 7).

Data packet reception processing and retransmission request packet reception processing, which differ from Embodiment 1, will now be described. Retransmission packet reception processing is the same as in Embodiment 1, and is therefore not described here.

Figure 18:
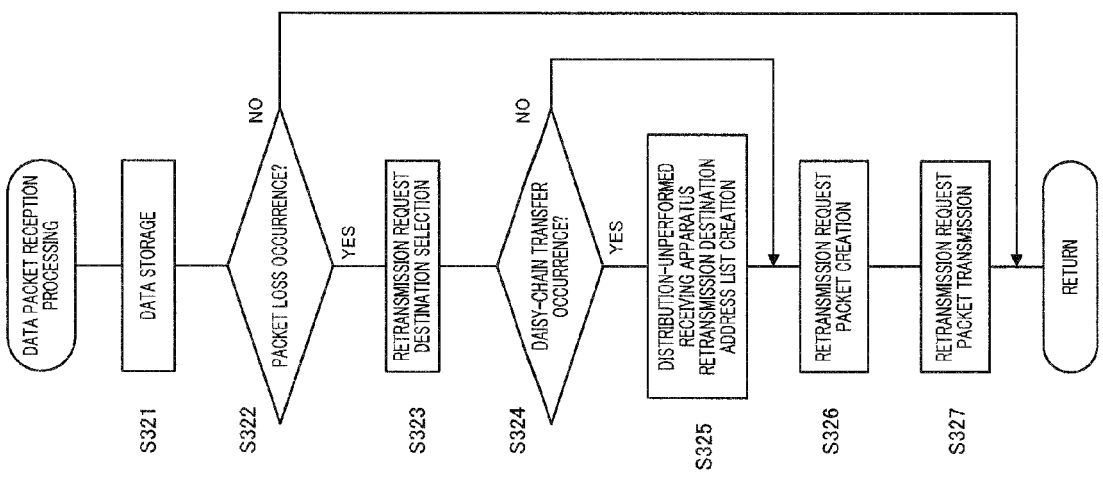
FIG. 18 is a flowchart showing data packet reception processing according to Embodiment 3 of the present invention.

Data packet reception processing will first be described using the flowchart shown in FIG. 18.

First, in step S321, packet loss detecting section 112 stores data contained in a data packet passed from packet check section 111 (or the entire data packet) in data storing section 117.

Next, in step S322, packet loss detecting section 112 determines whether or not a packet loss has occurred. If packet loss detecting section 112 determines that a packet loss has not occurred (S322: NO), it terminates this processing flow. On the other hand, if packet loss detecting section 112 determines that a packet loss has occurred (S322: YES), it passes the sequence number of the data packet for which the packet loss occurred, and the stored (last received) data packet, to retransmission request destination selecting section 113, and proceeds to step S323.

In step S323, retransmission request destination selecting section 113 selects a receiving node to be made the retransmission request destination from the bitmap and address list of the data packet passed from packet loss detecting section 112. Retransmission request destination selecting section 113 also records the sequence number of the data packet for which a retransmission request is to be made in a table stored in data storing section 117. Then retransmission request destination selecting section 113 reports the IP address of the selected retransmission request destination receiving node, the sequence number of the data packet for which a retransmission request is to be made, and the stored (last received) data packet, to daisy-chain distribution check section 120.

Next, in step S324, daisy-chain distribution check section 120 determines whether or not the data packet passed from retransmission request destination selecting section 113 has been transferred by means of daisy-chain distribution. If daisy-chain distribution check section 120 determines that transfer has been performed by means of daisy-chain distribution (S324: YES), it proceeds to step S325. On the other hand, if daisy-chain distribution check section 120 determines that transfer has not been performed by means of daisy-chain distribution (S324: NO), it proceeds to step S326.

In step S325, daisy-chain distribution check section 120 reports the IP address of the retransmission request destination receiving node and the sequence number of the data packet for which a packet loss occurred, together with the IP address entered after the IP address of the node of communication terminal apparatus 160 from among a plurality of IP addresses entered in the address list of the data packet passed from retransmission request destination selecting section 113, to retransmission request packet creating section 114.

In step S326, retransmission request packet creating section 114 creates a retransmission request packet from an IP address and sequence number reported by daisy-chain distribution check section 120. At this time, if a plurality of retransmission request source IP addresses have been reported by daisy-chain distribution check section 120, retransmission request packet creating section 114 enters all the retransmission request source IP addresses in the retransmission packet as retransmission request source addresses. Retransmission request packet creating section 114 then passes the created retransmission request packet to packet transmitting section 118.

Then, in step S327, packet transmitting section 118 transmits the retransmission request packet created by retransmission request packet creating section 114 to the retransmission request destination receiving node by means of unicast communication, and terminates this processing flow.

Figure 19:
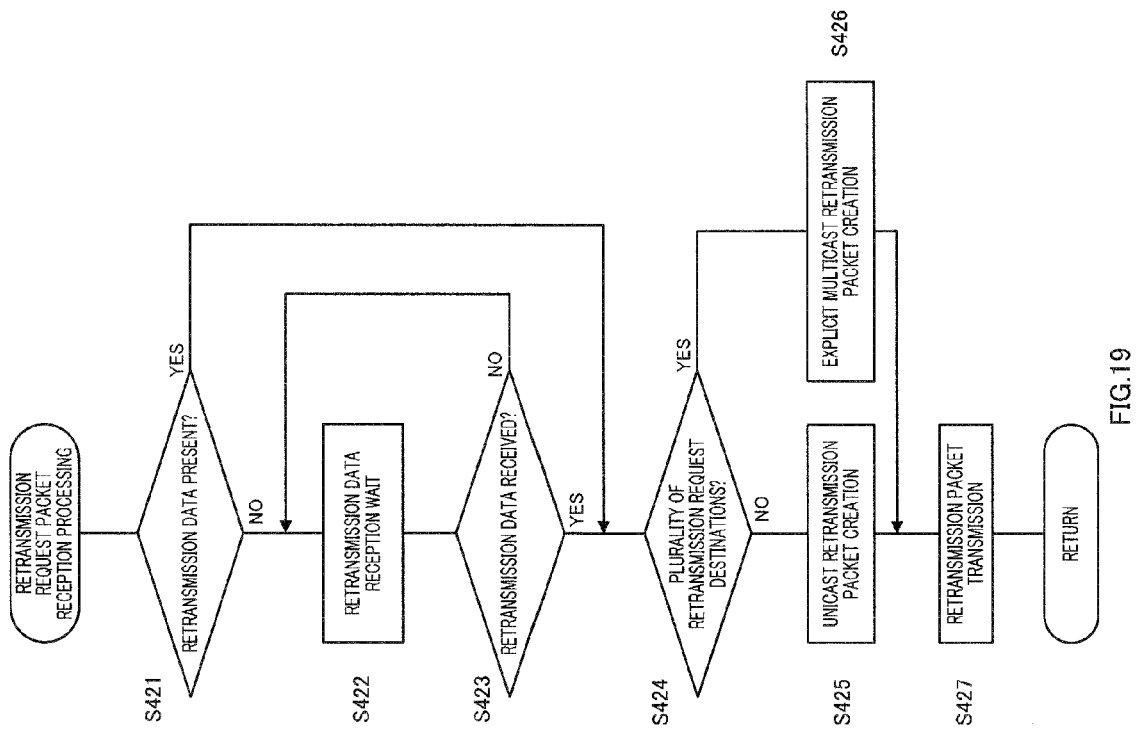
FIG. 19 is a flowchart showing retransmission request packet reception processing according to Embodiment 3 of the present invention.

Retransmission request packet reception processing will now be described using the flowchart shown in FIG. 19.

First, in step S421, retransmission packet creating section 115 acquires the sequence number of the data packet for which retransmission has been requested contained in the retransmission request packet passed from packet check section 111. Then retransmission packet creating section 115 determines whether or not data of that sequence number has been stored in data storing section 117. If retransmission packet creating section 115 determines that the data has not been stored in data storing section 117 (S421: NO), it proceeds to step S422. On the other hand, if retransmission packet creating section 115 determines that the data has been stored (S421: YES), it proceeds to step S424.

In step S422, retransmission packet creating section 115 waits for an arbitrary time period in order to receive the data packet for which retransmission has been requested.

Next, in step S423, retransmission packet creating section 115 again determines whether or not data of the data packet for which retransmission has been requested has been stored in data storing section 117. If retransmission packet creating section 115 determines that the data has been stored in data storing section 117 (S423: YES), it proceeds to step S424. On the other hand, if retransmission packet creating section 115 determines that the data has not been stored in data storing section 117 (S423: NO), it returns to step S422. Thus, retransmission packet creating section 115 repeats step S422 and step S423 until data of the data packet for which retransmission has been requested is stored in data storing section 117.

In step S424, retransmission packet creating section 115 determines whether or not a plurality of retransmission request source IP addresses have been entered in the retransmission request packet. If retransmission packet creating section 115 determines that there is one retransmission request source IP address (S424: NO), it proceeds to step S425. On the other hand, if retransmission packet creating section 115 determines that there are a plurality of retransmission request source IP addresses (S424: YES), it proceeds to step S426.

In step S425, retransmission packet creating section 115 creates a unicast retransmission packet with the retransmission request source address as the destination address. Retransmission packet creating section 115 then passes the created retransmission packet to packet transmitting section 118.

In step S426, retransmission packet creating section 115 creates an explicit multicast retransmission packet in which all the retransmission request source addresses are entered in the address list. Retransmission packet creating section 115 then passes the created retransmission packet to packet transmitting section 118.

In step S427, packet transmitting section 118 transmits the retransmission packet created by retransmission packet creating section 115 to the retransmission request source receiving node (communication terminal apparatus), and terminates this processing flow.

As described above, if a communication terminal apparatus according to Embodiment 2 detects a packet loss while daisy-chain distribution is being performed, it creates a retransmission request packet with a receiving node IP address entered after the IP address of the node of the communication terminal apparatus in the address list as the retransmission request source address, and transmits the created retransmission request packet. Also, if a communication terminal apparatus according to Embodiment 3 receives a retransmission request packet in which a plurality of retransmission request source addresses are entered, it creates an explicit multicast retransmission packet with all the retransmission request source addresses as destination addresses, and transmits the created retransmission packet. Thus, according to this embodiment, in addition to obtaining the effects of Embodiment 1, faster retransmission can be performed when daisy-chain distribution is used.

Embodiment 4

In Embodiment 1, an example was shown in which a retransmission request destination receiving node is selected using a bitmap and address list in a data packet. In Embodiment 4, an example is shown in which the response times of other receiving nodes are calculated in advance by exchanging information exchange packets with other receiving nodes, and a retransmission request destination receiving node is selected using the response times of other receiving nodes in addition to a bitmap and address list.

Figure 20:
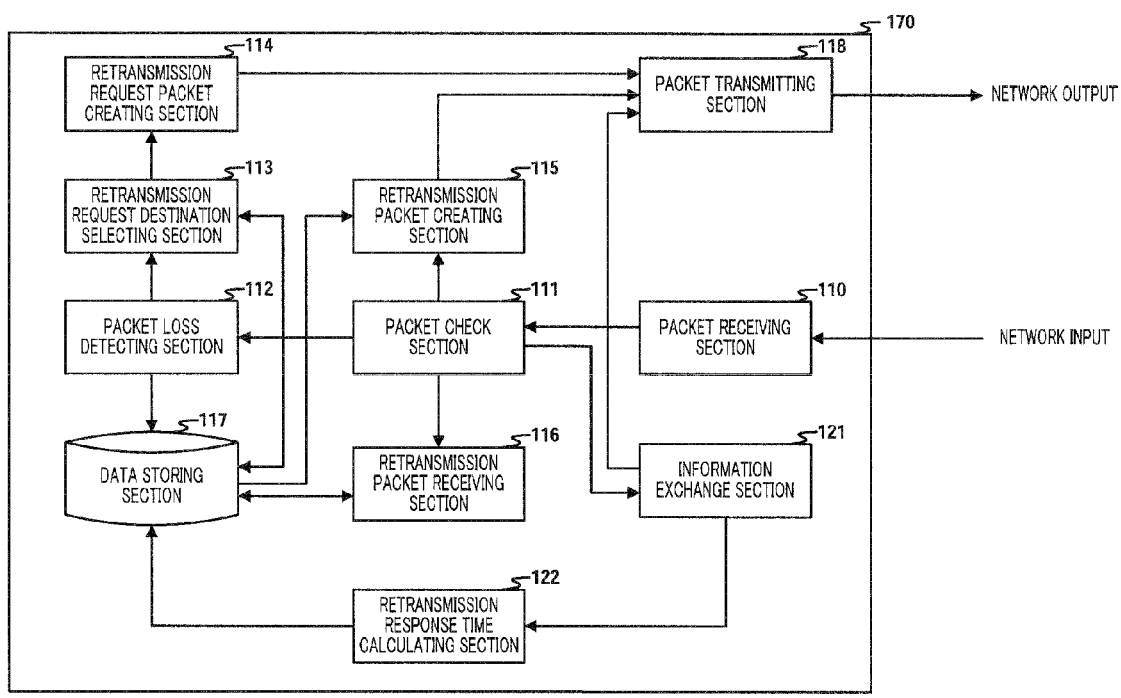
FIG. 20 is a block diagram showing the configuration of a communication terminal apparatus according to Embodiment 4 of the present invention.

FIG. 20 is a drawing showing the configuration of a communication terminal apparatus according to Embodiment 4 of the present invention. Configuration elements identical to those of a communication terminal apparatus according to Embodiment 1 are assigned the same reference codes as in Embodiment 1, and duplicate descriptions are omitted.

In FIG. 20, communication terminal apparatus 170 is equipped with information exchange section 121 and retransmission response time calculating section 122 in addition to the configuration of communication terminal apparatus 100 in FIG. 2. Configuration elements other than packet check section 111, packet loss detecting section 112, retransmission request destination selecting section 113, data storing section 117, packet transmitting section 118, information exchange section 121, and retransmission response time calculating section 122 are the same as in Embodiment 1, and are therefore not described here.

Packet check section 111 determines the type of packet received by packet receiving section 110 in the same way as a packet check section 111 of Embodiment 1. Then packet check section 111 passes the packet to an output destination according to the packet type.

Packet types are data packets, retransmission request packets, retransmission packets, and inquiry information exchange packets. Data packets, retransmission request packets, and retransmission packets are the same as in Embodiment 1, and are therefore not described here. An inquiry information exchange packet is a unicast packet created by a receiving node (communication terminal apparatus) that wishes to acquire the response time of another receiving node. A response information exchange packet is a unicast packet created by a receiving node (communication terminal apparatus) that has received an inquiry information exchange packet.

Returning to the description of packet check section 111, if packet check section 111 determines a received packet to be a data packet, it passes that packet to packet loss detecting section 112. If packet check section 111 determines a received packet to be a retransmission request packet, it passes that packet to retransmission packet creating section 115. If packet check section 111 determines a received packet to be a retransmission packet, it passes that packet to retransmission packet receiving section 116. And if packet check section 111 determines a received packet to be an inquiry information exchange packet or a response information exchange packet, it passes that packet to information exchange section 121.

In addition to performing the functions of a packet loss detecting section of Embodiment 1, packet loss detecting section 112 stores an address list and bitmap entered in a data packet passed from packet check section 111 in data storing section 117. Packet loss detecting section 112 need not store an address list and bitmap entered in a data packet if the same address list and bitmap have already been stored in data storing section 117.

Information exchange section 121 periodically creates an inquiry information exchange packet to measure the Round Trip Time (hereinafter referred to as "RTT") between that receiving node and another receiving node. At this time, information exchange section 121 acquires the IP addresses of other receiving nodes stored in data storing section 117, and creates an inquiry information exchange packet with those addresses as destinations.

Figure 21:
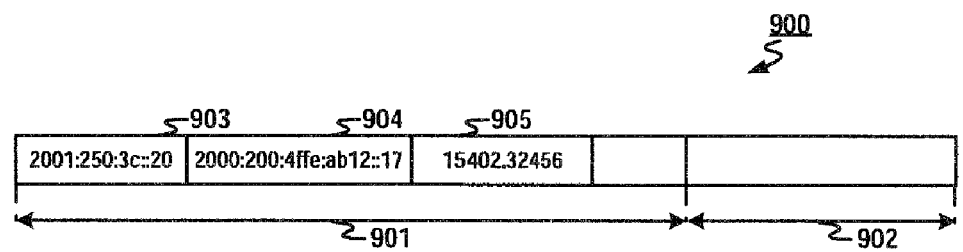
FIG. 21 is a drawing showing an example of the configuration of an inquiry information exchange packet.

An inquiry information exchange packet will now be described. FIG. 21 is a drawing showing an example of the configuration of an inquiry information exchange packet. In FIG. 21, inquiry information exchange packet 900 has header section 901 and payload 902. Header section 901 contains destination address 903, inquiry source address 904, and inquiry information exchange packet transmission time 905. Header section 901 may also have other headers, but these are not described here for convenience of description.

Returning to the description of information exchange section 121, information exchange section 121 periodically acquires the IP address of another receiving node stored in data storing section 117. Then information exchange section 121 enters the acquired other receiving node IP address in destination address 903 of header section 901. Information exchange section 121 also enters the IP address of information exchange section 121 (in the example in FIG. 21, the IP address of receiving node C) in inquiry source address 904. Information exchange section 121 then passes created inquiry information exchange packet 900 to packet transmitting section 118.

Also, when inquiry information exchange packet 900 is passed from packet check section 111, information exchange section 121 creates a response information exchange packet with the IP address entered in inquiry source address 904 of that inquiry information exchange packet 900 as the destination. At this time, information exchange section 121 enters the time entered in inquiry information exchange packet transmission time 905 of the inquiry information exchange packet in the response information exchange packet. Information exchange section 121 then passes the created response information exchange packet to packet transmitting section 118.

When a response information exchange packet is passed from packet check section 111, information exchange section 121 passes that packet to retransmission response time calculating section 122.

Retransmission response time calculating section 122 calculates the RTT from the receiving node that performed information exchange packet exchange from the difference between the time entered in transmission time 905 of the response information exchange packet passed from information exchange section 121 and the current time. Then retransmission response time calculating section 122 stores the calculated RTT in data storing section 117 together with the IP address of that receiving node. At this time, to prevent excessive tracking of rapid RTT changes, a weighted average of past RTTs may be stored in data storing section 117.

In addition to performing the functions of a data storing section of Embodiment 1, data storing section 117 also stores RTTs of receiving nodes, calculated by retransmission response time calculating section 122, as response times. FIG. 22 is a drawing showing an example of a table in which response times are recorded. This table is an example in which response times for receiving nodes A through C are recorded. This table is used by retransmission request destination selecting section 113 described later herein.

In the same way as a retransmission request destination selecting section of Embodiment 1, retransmission request destination selecting section 113 selects a receiving node to which to make a retransmission request for a data packet for which the occurrence of a packet loss has been reported by packet loss detecting section 112. At this time, retransmission request destination selecting section 113 selects a receiving node to which a retransmission request is to be made using the table in which receiving node response times are recorded, stored in data storing section 117, in addition to the bitmap and address list in a data packet passed from packet loss detecting section 112.

Retransmission request destination selecting section 113 searches the bitmap in the data packet passed from packet loss detecting section 112, and selects a bit indicating that distribution has been completed. Then retransmission request destination selecting section 113 checks the address list of the same data packet, and acquires the IP address of the receiving node corresponding to the chosen bit. If there are a plurality of "distribution-completed" bits in the bitmap, retransmission request destination selecting section 113 checks the table of receiving node response times stored in data storing section 117 (see FIG. 22), and compares the response time of each distribution-completed receiving node with the time until data for which a retransmission request is made is regenerated. If the result is that the response times of all the receiving nodes exceed this time until data is regenerated, retransmission request destination selecting section 113 determines that even if a retransmission request is made the retransmission data cannot be received by the time of regeneration, and therefore does not make a retransmission request. If the response times of one or more of the receiving nodes are shorter than this time until data is regenerated, retransmission request destination selecting section 113 selects one of these shorter-response-time receiving nodes as a retransmission request destination. For example, retransmission request destination selecting section 113 may select the receiving node with the shortest response time as the retransmission request destination.

Figure 23:
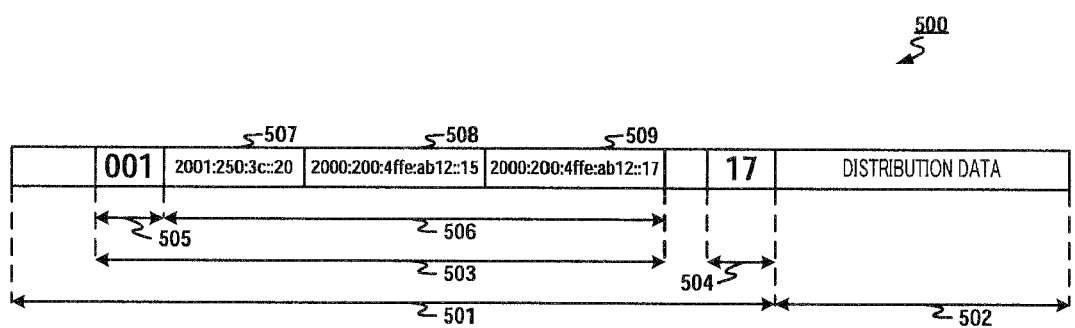
FIG. 23 is a drawing showing an example of the configuration of a data packet.

Assume, for example, that receiving node A IP address 507, receiving node C IP address 508, and receiving node D IP address 509 have been entered in address list 506 of the data packet shown in FIG. 23 (bitmap 505 being different from that of the data packet in FIG. 3). Assume also that, in bitmap 505, as bits indicating whether or not distribution has been completed for the receiving node IP addresses entered in address list 506, one bit is assigned to each of IP addresses 507 through 509 in address list 506, in that order. In the data packet example shown in FIG. 13, the bitmap is "0·0·1", with a 0 bit indicating completion of distribution and a 1 bit indicating that distribution has not been performed, signifying that receiving node A and receiving node C are receiving nodes for which distribution has been completed (0), and receiving node D is a receiving node for which distribution has not been performed (1). In this case, retransmission request destination selecting section 113 selects the IP addresses of receiving node A and receiving node C as retransmission request destination candidates. Then retransmission request destination selecting section 113 compares the response times of receiving node A and receiving node C with the time until data for which a retransmission request is made is regenerated. For example, if the response times of the receiving nodes are as shown in FIG. 22, and the time until data for which a retransmission request is made is regenerated is 15 milliseconds (ms), retransmission request destination selecting section 113 selects receiving node A as the retransmission request destination since the response time of receiving node A is less than 15 milliseconds.

In the same way as a retransmission request destination selecting section of Embodiment 1, retransmission request destination selecting section 113 reports the IP address of the receiving node selected as a retransmission request destination, and the sequence number of a data packet for which a packet loss has occurred, to retransmission request packet creating section 114. Retransmission request destination selecting section 113 also records the sequence number of a data packet for which a retransmission request is made, in the same way as a retransmission request destination selecting section of Embodiment 1 (see FIG. 4).

In addition to performing the functions of a packet transmitting section of Embodiment 1, packet transmitting section 118 also enters the current time in transmission time 905 of an inquiry information exchange packet created by information exchange section 121. Packet transmitting section 118 also transmits an inquiry information exchange packet and response information exchange packet to communication network 200 by means of unicast communication. Packet transmitting section 118 may also enter inquiry information exchange packet transmission time 905 in payload 902.

The operation of communication terminal apparatus 170 configured as described above will now be explained. Communication terminal apparatus 170 operations are broadly divided into inquiry information exchange packet transmission processing performed periodically and autonomously, and packet reception processing performed when a packet is received.

Figure 24:
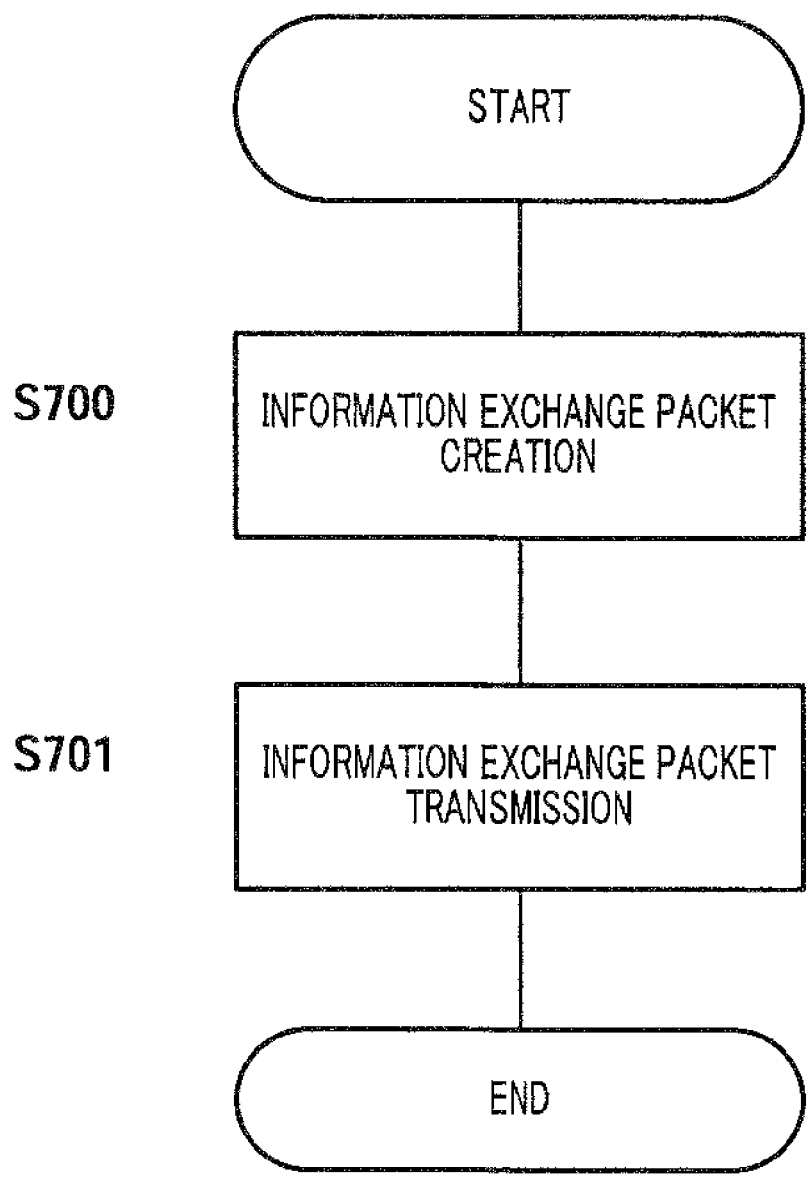
FIG. 24 is a flowchart showing operation at the time of inquiry information exchange packet transmission by a communication terminal apparatus according to Embodiment 4 of the present invention.

FIG. 24 is a flowchart showing the operation of communication terminal apparatus 170 when performing inquiry information exchange packet transmission processing.

First, in step S700, information exchange section 121 acquires the IP addresses of other receiving nodes stored in data storing section 117, and creates an inquiry information exchange packet with those addresses as destinations. Information exchange section 121 then passes the created inquiry information exchange packet to packet transmitting section 118.

Next, in step S701, packet transmitting section 118 enters the current time in the inquiry information exchange packet created by information exchange section 121 as the transmission time. Packet transmitting Section 118 then transmits the inquiry information exchange packet to an inquiry destination receiving node, and terminates this processing flow.

Figure 25:
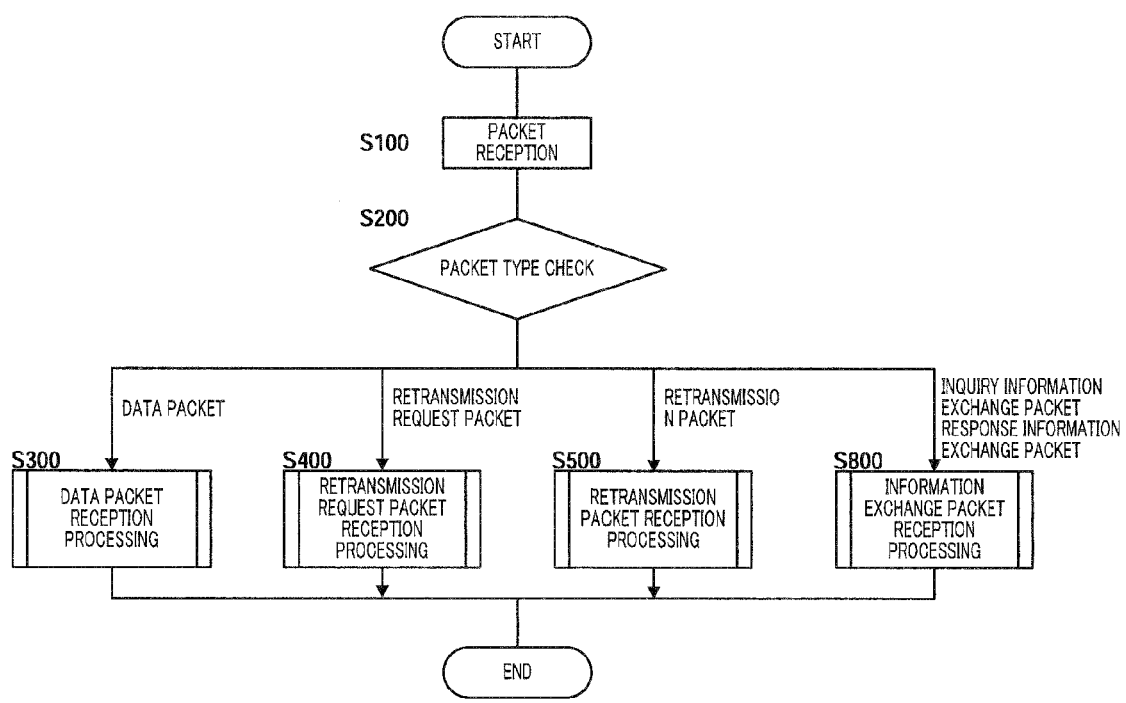
FIG. 25 is a flowchart showing operation at the time of packet reception by a communication terminal apparatus according to Embodiment 4 of the present invention.

FIG. 25 is a flowchart showing the operation of communication terminal apparatus 170 when performing packet reception processing.

First, in step S100, packet receiving section 110 receives a packet from communication network 200. Then packet receiving section 110 passes the received packet to packet check section 111.

Next, in step S200, packet check section 111 determines the type of packet received by packet receiving section 110. Then, if packet check section 111 determines the received packet to be a data packet (S200: DATA PACKET), it passes that packet to packet loss detecting section 112, and proceeds to step S300. If packet check section 111 determines the received packet to be a retransmission request packet (S200: RETRANSMISSION REQUEST PACKET), it passes that packet to retransmission packet creating section 115, and proceeds to step S400. If packet check section 111 determines the received packet to be a retransmission packet (S200: RETRANSMISSION PACKET), it passes that packet to retransmission packet receiving section 116, and proceeds to step S500. If packet check section 111 determines the received packet to bean inquiry information exchange packet or response information exchange packet (S200: INQUIRY INFORMATION EXCHANGE PACKET, RESPONSE INFORMATION EXCHANGE PACKET), it passes that packet to information exchange section 121, and proceeds to step S800.

In step S300, data packet reception processing is performed, and this processing flow is terminated. Data packet reception processing will be described later herein using FIG. 27.

In step S400, retransmission request packet reception processing is performed, and this processing flow is terminated. Retransmission request packet reception processing is the same as in Embodiment 1, and therefore a description thereof is omitted here.

In step S500, retransmission packet reception processing is performed, and this processing flow is terminated. Retransmission packet reception processing is the same as in Embodiment 1, and therefore a description thereof is omitted here.

In step S800, information exchange packet reception processing is performed, and this processing flow is terminated. The content of information exchange packet reception processing differs according to the type of information exchange packet received. When a received information exchange packet is an inquiry information exchange packet, information exchange packet reception processing is processing that transmits a response information exchange packet to the inquiry source. On the other hand, when a received information exchange packet is a response information exchange packet, information exchange packet reception processing is processing that stores the IP address of a receiving node that performed information exchange, and the response time, in data storing section 117. Information exchange packet reception processing will be described later herein using FIG. 26.

Data packet reception processing and information exchange packet reception processing, which differ from Embodiment 1, will now be described.

Figure 26:
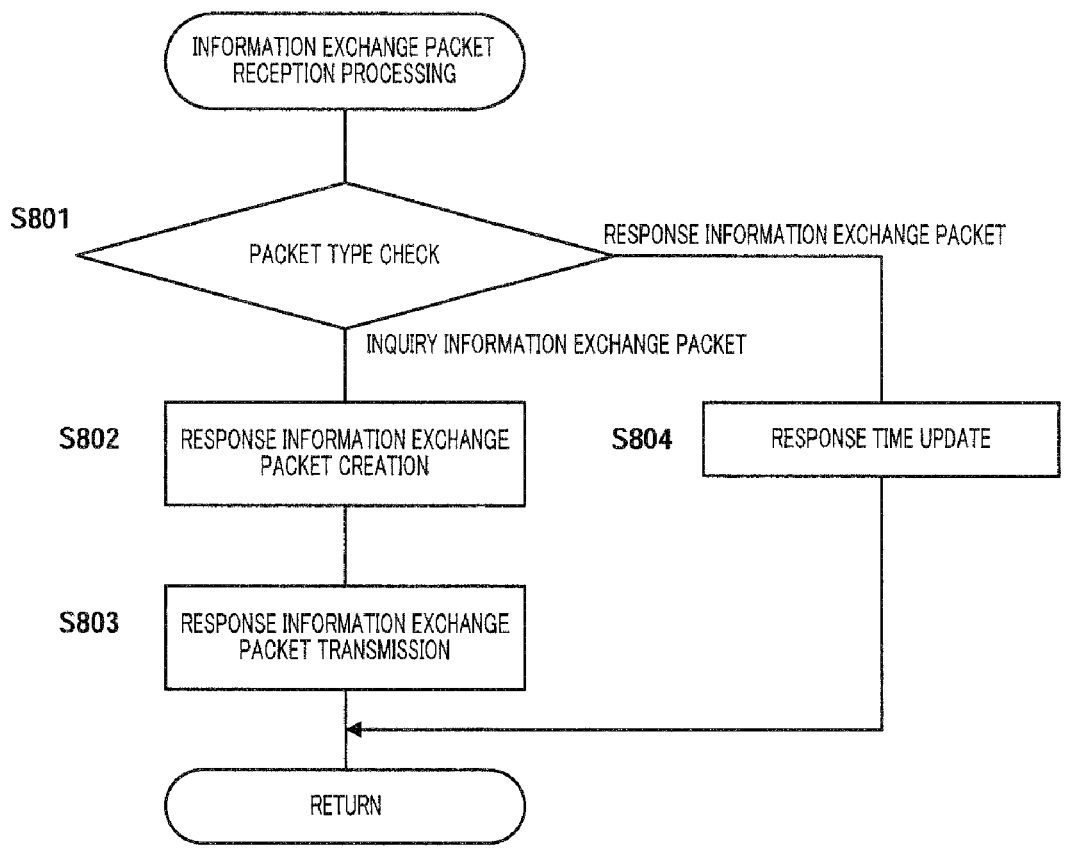
FIG. 26 is a flowchart showing information exchange packet reception processing according to Embodiment 4 of the present invention.

Information exchange packet reception processing (step S800) will first be described using the flowchart shown in FIG. 26.

First, in step S801, information exchange section 121 determines the type of information exchange packet passed from packet check section 111. Then, if information exchange section 121 determines the received packet to be an inquiry information exchange packet (S801: INQUIRY INFORMATION EXCHANGE PACKET), it proceeds to step S802. On the other hand, if information exchange section 121 determines the received packet to be a response information exchange packet (S801: RESPONSE INFORMATION EXCHANGE PACKET), it passes that packet to retransmission response time calculating section 122, and proceeds to step S804.

In step S802, information exchange section 121 creates a response information exchange packet with the IP address entered in the inquiry source address of the inquiry information exchange packet as the destination. At this time, information exchange section 121 enters the transmission time entered in the inquiry information exchange packet transmission time in the created response information exchange packet. Information exchange section 121 then passes the created response information exchange packet to packet transmitting section 118.

Next, in step S803, packet transmitting section 118 transmits the response information exchange packet created by information exchange section 121 to the inquiry source receiving node, and terminates this processing flow.

In step S804, retransmission response time calculating section 122 calculates the RTT of the receiving node that performed information exchange packet exchange from the difference between the transmission time entered in the response information exchange packet passed from information exchange section 121 and the current time. Then retransmission response time calculating section 122 stores the calculated receiving node RTT in data storing section 117 together with the IP address of that receiving node, and terminates this processing flow.

Figure 27:
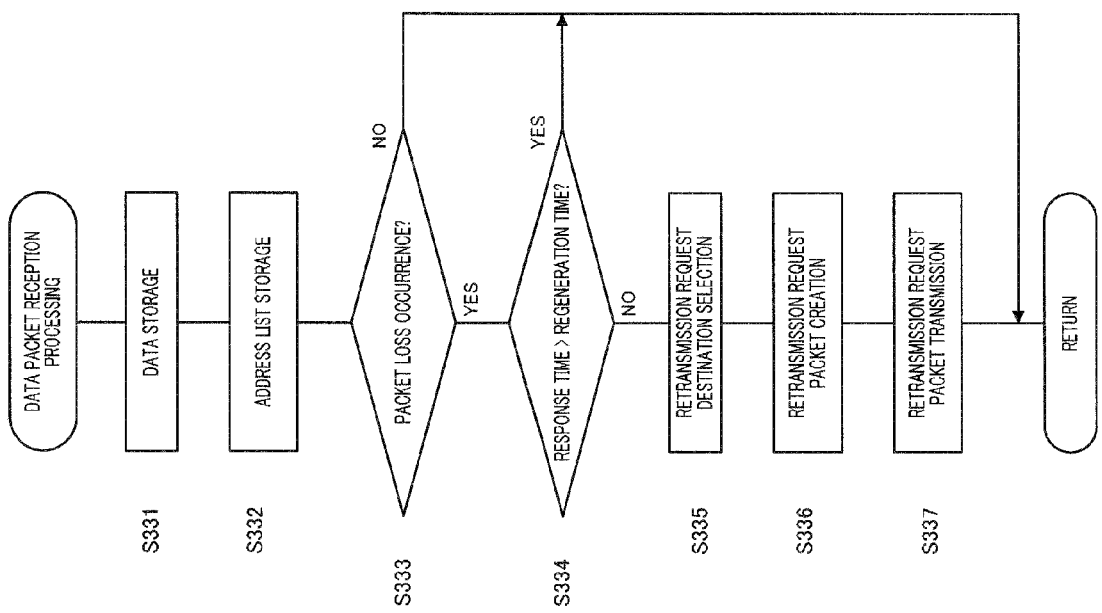
FIG. 27 is a flowchart showing data packet reception processing according to Embodiment 4 of the present invention.

Data packet reception processing (step S300) will now be described using the flowchart shown in FIG. 27.

First, in step S331, packet loss detecting section 112 stores data contained in a data packet passed from packet check section 111 (or the entire data packet) in data storing section 117.

Next, in step S332, packet loss detecting section 112 stores the address list and bitmap entered in the data packet passed from packet check section 111 in data storing section 117.

Then, in step S333, packet loss detecting section 112 determines whether or not a packet loss has occurred. If packet loss detecting section 112 determines that a packet loss has not occurred (S333: NO), it terminates this processing flow. On the other hand, if packet loss detecting section 112 determines that a packet loss has occurred (S333: YES), it passes the sequence number of the data packet for which the packet loss occurred, and the stored (last received) data packet, to retransmission request destination selecting section 113, and proceeds to step S334.

In step S334, retransmission request destination selecting section 113 acquires the IP address of a receiving node for which distribution has been completed from the bitmap and address list of the data packet passed from packet loss detecting section 112. Then retransmission request destination selecting section 113 checks the response time of each distribution-completed receiving node stored in data storing section 117. Retransmission request destination selecting section 113 then determines whether or not the response time of each receiving node exceeds the time until data for which a retransmission request is made is regenerated. If retransmission request destination selecting section 113 determines that the response times of all the receiving nodes exceed this time until data is regenerated (S334: YES), it terminates this processing flow. On the other hand, if retransmission request destination selecting section 113 determines that the response times of one or more of the receiving nodes are shorter than this time until data is regenerated (S334: NO), it proceeds to step S335.

In step S335, retransmission request destination selecting section 113 selects one of the receiving nodes whose response times are shorter than this time until data is regenerated as a retransmission request destination. Retransmission request destination selecting section 113 reports the IP address of the selected retransmission request destination receiving node, and the sequence number of the data packet for which a retransmission request is to be made, to retransmission request packet creating section 114.

Next, in step S336, retransmission request packet creating section 114 creates a unicast retransmission request packet from the IP address and sequence number reported by retransmission request destination selecting section 113. Retransmission request packet creating section 114 then passes the created retransmission request packet to packet transmitting section 118.

Then, in step S337, packet transmitting section 118 transmits the retransmission request packet created by retransmission request packet creating section 114 to the retransmission request destination receiving node, and terminates this processing flow.

As described above, a communication terminal apparatus according to Embodiment 4 calculates the response times of other receiving nodes using inquiry information exchange packets and response information exchange packets. Then a communication terminal apparatus according to Embodiment 4 selects a receiving node to which a retransmission request is to be made using the calculated response times in addition to a bitmap and address list, and makes a retransmission request to the selected receiving node by means of unicast communication. Thus, according to this embodiment, in addition to obtaining the effects of Embodiment 1, a receiving node capable of receiving retransmission data by the time data for which a retransmission request is made is regenerated can be selected as a retransmission request destination.

Embodiment 5

In Embodiment 4, an example was shown in which the response times of other receiving nodes are calculated in advance by exchanging information exchange packets with other receiving nodes, and a retransmission request destination receiving node is selected using a bitmap and address list and the response times of other receiving nodes. In Embodiment 5, an example is shown in which session information and so forth of other receiving nodes is collected by exchanging information exchange packets with other receiving nodes, and a retransmission request destination receiving node is selected using session information and so forth of other receiving nodes as well as a bitmap and address list.

Figure 28:
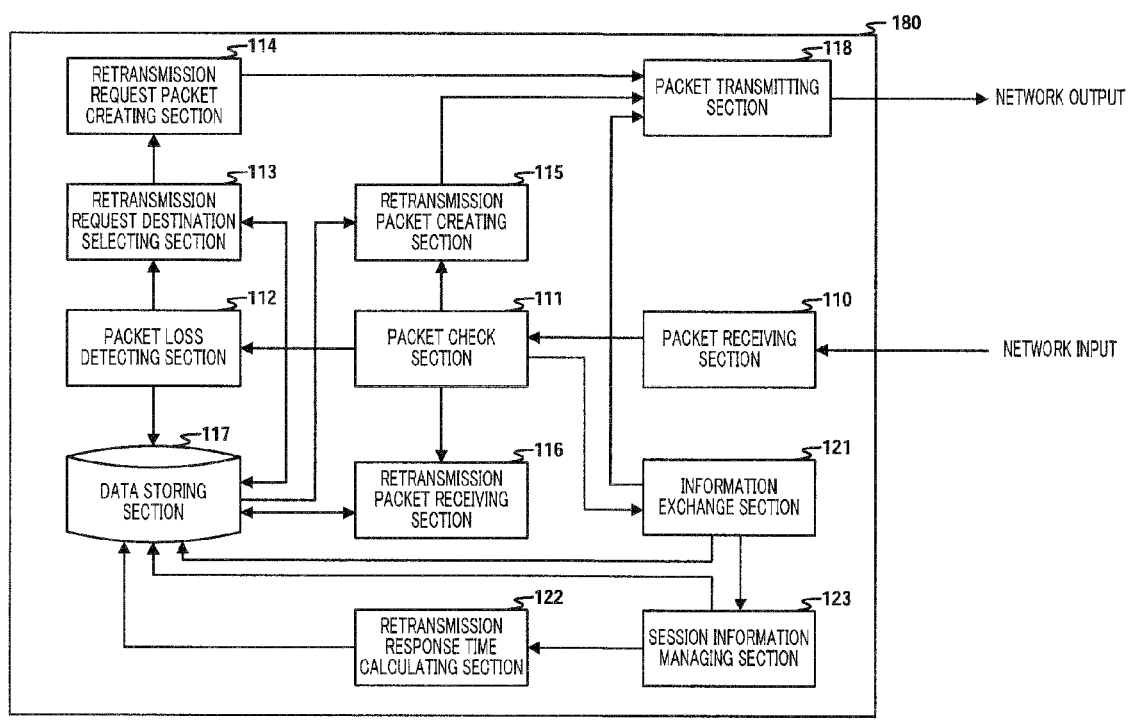
FIG. 28 is a block diagram showing the configuration of a communication terminal apparatus according to Embodiment 5 of the present invention.

FIG. 28 is a drawing showing the configuration of a communication terminal apparatus according to Embodiment 5 of the present invention. Configuration elements identical to those of a communication terminal apparatus according to Embodiment 4 are assigned the same reference codes as in Embodiment 4, and duplicate descriptions are omitted.

In FIG. 28, communication terminal apparatus 180 is equipped with session information managing section 123 in addition to the configuration of communication terminal apparatus 170 in FIG. 20. Configuration elements other than retransmission request destination selecting section 113, data storing section 117, information exchange section 121, retransmission response time calculating section 122, and session information managing section 123 are the same as in Embodiment 4, and are therefore not described here.

In the same way as an information exchange section of Embodiment 4, information exchange section 121 periodically creates an inquiry information exchange packet to acquire session information and so forth of another receiving node. At this time, information exchange section 121 creates a plurality of consecutive information exchange packets for one receiving node. Also, in order to measure the failure event rate vis-à-vis another receiving node, information exchange section 121 enters a sequence number and the RTT when an information exchange packet was last exchanged with that receiving node in an inquiry information exchange packet.

Figure 29:
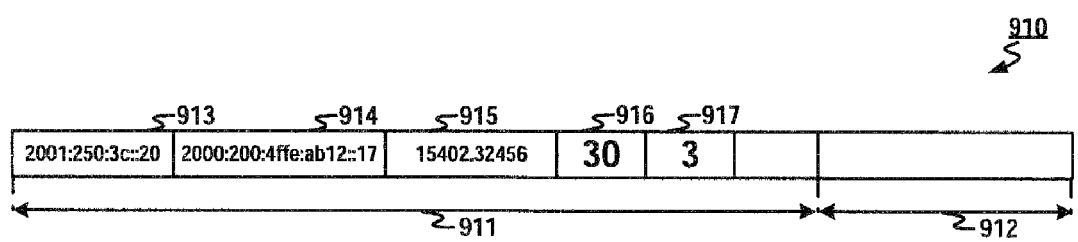
FIG. 29 is a drawing showing an example of the configuration of an inquiry information exchange packet.

An inquiry information exchange packet will now be described. FIG. 29 is a drawing showing an example of the configuration of an inquiry information exchange packet. In FIG. 29, inquiry information exchange packet 910 has header section 911 and payload 912. Header section 911 contains destination address 913, inquiry source address 914, inquiry information exchange packet transmission time 915, RTT 916, and sequence number 917. Header section 911 may also have other headers, but these are not described here for convenience of description.

Returning to the description of information exchange section 121, information exchange section 121 periodically acquires the IP address of another receiving node stored in data storing section 117. Then information exchange section 121 enters the acquired other receiving node IP address in destination address 913 of header section 911. Information exchange section 121 also enters the IP address of information exchange section 121 (in the example in FIG. 29, the IP address of receiving node C) in inquiry source address 914, enters the RTT last measured from an inquiry destination receiving node (in the example in FIG. 29, "30 (milliseconds)") in RTT 916, and enters a sequence number consecutive in a series of inquiry information exchange packets (in the example in FIG. 29, integer "3") in sequence number 917. Information exchange section 121 may also enter RTT 916 and sequence number 917 in payload 912. Information exchange section 121 then passes the created inquiry information exchange packet to packet transmitting section 118.

If an inquiry information exchange packet is passed from packet check section 111, information exchange section 121 determines whether or not a packet loss has occurred in the series of inquiry information exchange packets. For example, information exchange section 121 can detect the occurrence of a packet loss by checking the sequence numbers entered in the header sections of a series of inquiry information exchange packets. If information exchange section 121 determines that a packet loss has occurred, it takes a packet loss within one RTT from the RTT entered in the inquiry information exchange packet as one event loss, and calculates a loss event rate, which is the proportion of event loss occurrences from the time at which the previous inquiry information exchange packet was received. Furthermore, information exchange section 121 finds the inquiry information exchange packet data amount that has been successfully received. Information exchange section 121 then stores the found loss event rate and successfully received data amount in data storing section 117, associated with the IP address of the relevant receiving node.

Also, in the same way as an information exchange section of Embodiment 4, information exchange section 121 creates a response information exchange packet with the IP address entered in the inquiry source address of an inquiry information exchange packet as the destination. At this time, information exchange section 121 enters not only the transmission time entered in the inquiry information exchange packet, but also the loss event rate and the successfully received data amount, in the response information exchange packet. Furthermore, information exchange section 121 may also enter information such as the time for which the node of communication terminal apparatus 180 can hold a data packet and the processing performance of the node of communication terminal apparatus 180 in the response information exchange packet. Information exchange section 121 then passes the created response information exchange packet to packet transmitting section 118.

When an inquiry information exchange packet is passed from packet check section 111, information exchange section 121 also passes that packet to session information managing section 123.

Session information managing section 123 calculates the RTT from the receiving node that performed information exchange packet exchange from the difference between the time entered in transmission time 905 of the response information exchange packet passed from information exchange section 121 and the current time. Then session information managing section 123 stores the calculated RTT in data storing section 117, associated with the IP address of the relevant receiving node. At this time, to prevent excessive tracking of rapid RTT changes, a weighted average of past RTTs may be stored in data storing section 117.

Session information managing section 123 also manages information such as a loss event rate and successfully received data amount entered in a response information exchange packet returned periodically from another receiving node, as well as an RTT calculated from a transmission time entered in a response information exchange packet, and so forth. From these items of information, session information managing section 123 estimates an available empty band of a receiving node performing information exchange packet exchange.

Session information managing section 123 estimates an available empty band of another receiving node based on TFRC (TCP Friendly Rate Control) In TFRC, an available empty band of another receiving node is estimated based on the following equation (see M. Handley et al., "TCP Friendly Rate Control (TFRC): Protocol Specification", RFC 3448.)

$$X = \frac{s}{R\sqrt{2bp/3} + (t\_RTO*(3\sqrt{3bp/8}*p*(1+32p^2)))}$$

The meanings of the terms in this equation are as follows:
X: Available band (bps)
R: RTT (seconds)
b: TCP ACK count
p: Loss event rate
s: Packet size (bytes)
t_RTO: TCP timeout value (=4×R)

In this way, session information managing section 123 estimates the available empty band of another receiving node from the RTT and loss event rate. Then session information managing section 123 passes an estimate of the available empty band of another receiving node to retransmission response time calculating section 122.

Retransmission response time calculating section 122 calculates a correction value for amending the response time of a receiving node from the loss event rate entered in a response information exchange packet and an available empty band estimate passed from session information managing section 123. If the available empty band value of the counterpart receiving node is large, retransmission response time calculating section 122 makes the correction value large so that there will be a margin in the band even if retransmission is requested. On the other hand, if the available empty band value of the counterpart receiving node is small, retransmission response time calculating section 122 makes the correction value small. Also, if the loss event rate vis-à-vis the counterpart receiving node is high, retransmission response time calculating section 122 makes the correction value small since the possibility of a retransmission packet or retransmission request packet being lost is high even if retransmission is requested. On the other hand, if the loss event rate vis-à-vis the counterpart receiving node is low, retransmission response time calculating section 122 makes the correction value large. At this time, retransmission response time calculating section 122 may also calculate a correction value using other information entered in a response information exchange packet. For example, when information relating to receiving node processing performance is contained in a response information exchange packet, retransmission response time calculating section 122 makes the correction value large if the processing performance of the receiving node is high. On the other hand, retransmission response time calculating section 122 makes the correction value small if the processing performance of the receiving node is low. Retransmission response time calculating section 122 then stores the calculated correction value in data storing section 117 together with the IP address of the relevant receiving node.

If the time for which the counterpart receiving node retains data is entered in a response information exchange packet, retransmission response time calculating section 122 checks a table of receiving node response times stored in data storing section 117 (see FIG. 22), and compares the response time of the counterpart receiving node with the time for which that receiving node retains data. If the result is that the response time of the counterpart receiving node exceeds the time for which that receiving node retains data, retransmission response time calculating section 122 determines that even if a retransmission request is made the retransmission data cannot be received by the time of regeneration, and therefore provides for the node of communication terminal apparatus 180 not to make a retransmission request to that receiving node. For example, retransmission response time calculating section 122 can provide for the node of communication terminal apparatus 180 not to make a retransmission request to that receiving node by deleting the response time of that receiving node from the table of receiving node response times stored in data storing section 117 (see FIG. 22). Retransmission response time calculating section 122 can also provide for the node of communication terminal apparatus 180 not to make a retransmission request to that receiving node by amending the numeric value of the response time of that receiving node in the table of receiving node response times to an extremely large value.

In addition to performing the functions of a data storing section of Embodiment 4, data storing section 117 also stores response time correction values calculated by retransmission response time calculating section 122. These items of information are used by retransmission request destination selecting section 113 described later herein.

In the same way as a retransmission request destination selecting section of Embodiment 4, retransmission request destination selecting section 113 selects a receiving node to which to make a retransmission request for a data packet for which the occurrence of a packet loss has been reported by packet loss detecting section 112. At this time, retransmission request destination selecting section 113 selects a receiving node to which a retransmission request is to be made using a response time correction value stored in data storing section 117, in addition to the bitmap and address list in a data packet passed from packet loss detecting section 112 and receiving node response times.

In the same way as a retransmission request destination selecting section of Embodiment 4, retransmission request destination selecting section 113 selects a receiving node for which distribution of a data packet for which retransmission is requested has been completed, and whose response time is shorter than the time until data for which a retransmission request is made is regenerated. If there are a plurality of receiving nodes that satisfy these conditions, retransmission request destination selecting section 113 subtracts a correction value from the response time of each receiving node and calculates an amended response time. Then retransmission request destination selecting section 113 selects the receiving node with the shortest amended response time as the retransmission request destination. If there are a plurality of receiving nodes that satisfy the above conditions, retransmission request destination selecting section 113 may also compare the correction values of the receiving nodes and select the receiving node with the largest correction value as the retransmission request destination.

In the same way as a retransmission request destination selecting section of Embodiment 4, retransmission request destination selecting section 113 reports the IP address of the receiving node selected as a retransmission request destination, and the sequence number of a data packet for which a packet loss has occurred, to retransmission request packet creating section 114. Retransmission request destination selecting section 113 also records the sequence number of a data packet for which a retransmission request is made, in the same way as a retransmission request destination selecting section of Embodiment 4.

The operation of communication terminal apparatus 180 configured as described above will now be explained. As in the case of a retransmission request destination selecting section of Embodiment 4, communication terminal apparatus 180 operations are broadly divided into inquiry information exchange packet transmission processing performed periodically and autonomously, and packet reception processing performed when a packet is received. Inquiry information exchange packet transmission processing and packet reception processing are the same as in Embodiment 4, and are therefore not described here.

Data packet reception processing and information exchange packet reception processing in packet reception processing, which differ from Embodiment 4, will now be described. Retransmission request packet reception processing and retransmission packet reception processing in packet reception processing are the same as in Embodiment 4, and are therefore not described here.

Figure 30:
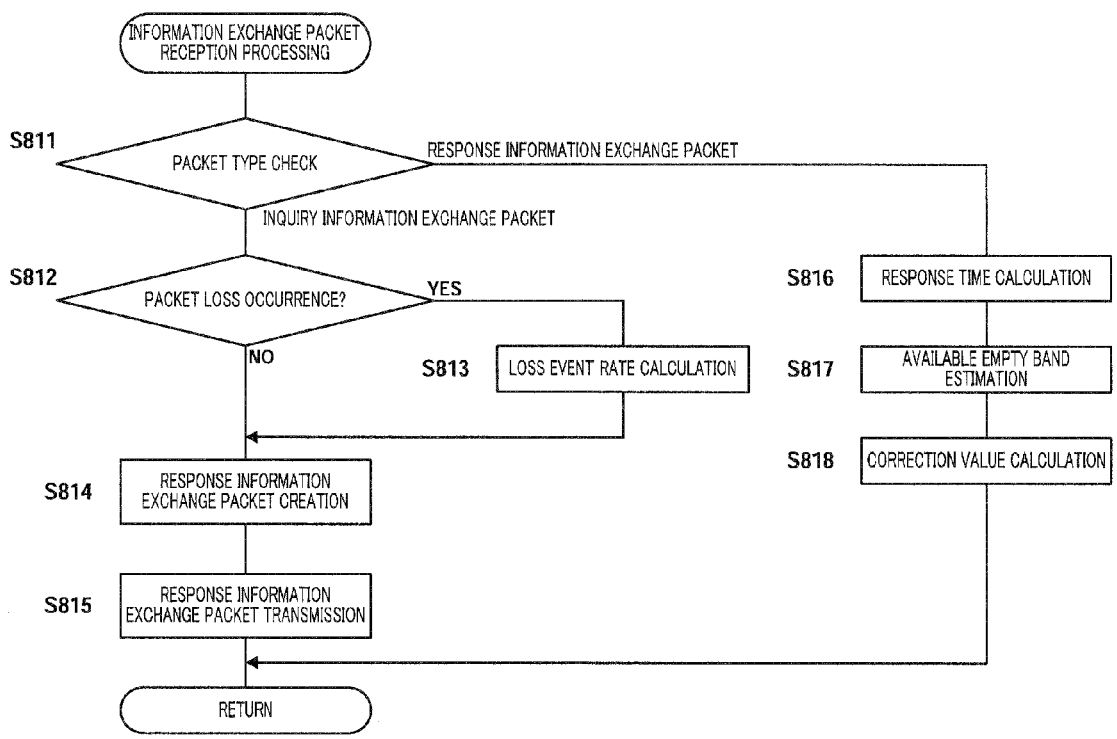
FIG. 30 is a flowchart showing information exchange packet reception processing according to Embodiment 5 of the present invention.

Information exchange packet reception processing (step S800) will first be described using the flowchart shown in FIG. 30.

First, in step S8101, information exchange section 121 determines the type of information exchange packet passed from packet check section 111. Then, if information exchange section 121 determines the received packet to be an inquiry information exchange packet (S811: INQUIRY INFORMATION EXCHANGE PACKET), it proceeds to step S812. On the other hand, if information exchange section 121 determines the received packet to be a response information exchange packet (S811: RESPONSE INFORMATION EXCHANGE PACKET), it passes that packet to session information managing section 123, and proceeds to step S816.

In step S812, information exchange section 121 determines whether or not a packet loss has occurred in a series of inquiry information exchange packets passed from packet check section 111. If packet loss detecting section 112 determines that a packet loss has occurred (S812: YES), it proceeds to step S813. On the other hand, if packet loss detecting section 112 determines that a packet loss has not occurred (S812: NO), it proceeds to step S814.

In step S813, information exchange section 121 calculates a loss event rate from the RTT entered in the inquiry information exchange packet. Information exchange section 121 also finds the successfully received inquiry information exchange packet data amount. Information exchange section 121 then stores the found loss event rate and successfully received data amount in data storing section 117, associated with the IP address of the relevant receiving node.

In step S814, information exchange section 121 creates a response information exchange packet with the IP address entered in the inquiry source address of the inquiry information exchange packet as the destination. At this time, information exchange section 121 enters the transmission time entered in the inquiry information exchange packet transmission time, together with the loss event rate and successfully received data amount found in step S813, in the response information exchange packet. Information exchange section 121 then passes the created response information exchange packet to packet transmitting section 118.

Next, in step S815, packet transmitting section 118 transmits the response information exchange packet created by information exchange section 121 to the inquiry source receiving node, and terminates this processing flow.

In step S816, session information managing section 123 calculates the RTT of the receiving node that performed information exchange from the difference between the transmission time entered in the response information exchange packet passed from information exchange section 121 and the current time. Then session information managing section 123 stores the calculated RTT in data storing section 117, associated with the IP address of the relevant receiving node.

Next, in step S817, session information managing section 123 estimates the available empty band of the receiving node that performed information exchange from the RTT calculated in step S816 and the loss event rate entered in the response information exchange packet. Then session information managing section 123 stores the estimated available empty band of the other receiving node in data storing section 117, associated with the IP address of the relevant receiving node.

Next, in step S818, retransmission response time calculating section 122 calculates a correction value for amending the response time from the loss event rate entered in the response information exchange packet and the available empty band value estimated in step S817. Then retransmission response time calculating section 122 stores the calculated correction value in data storing section 117, associated with the IP address of the relevant receiving node, and terminates this processing flow.

Figure 31:
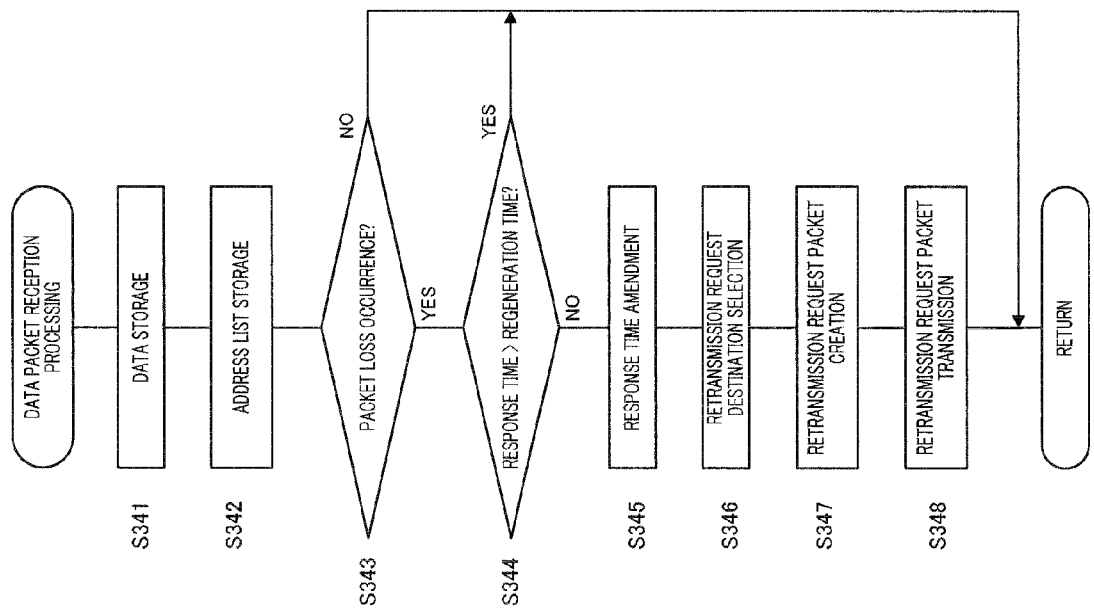
FIG. 31 is a flowchart showing data packet reception processing according to Embodiment 5 of the present invention.

Data packet reception processing (step S300) will now be described using the flowchart shown in FIG. 31.

First, in step S341, packet loss detecting section 112 stores data contained in a data packet passed from packet check section 111 (or the entire data packet) in data storing section 117.

Next, in step S342, packet loss detecting section 112 stores the address list and bitmap entered in the data packet passed from packet check section 111 in data storing section 117.

Then, in step S343, packet loss detecting section 112 determines whether or not a packet loss has occurred. If packet loss detecting section 112 determines that a packet loss has not occurred (S343: NO), it terminates this processing flow. On the other hand, if packet loss detecting section 112 determines that a packet loss has occurred (S343: YES), it passes the sequence number of the data packet for which the packet loss occurred, and the stored (last received) data packet, to retransmission request destination selecting section 113, and proceeds to step S344.

In step S334, retransmission request destination selecting section 113 acquires the IP address of a receiving node for which distribution has been completed from the bitmap and address list of the data packet passed from packet loss detecting section 112. Then retransmission request destination selecting section 113 checks the response time of each distribution-completed receiving node stored in data storing section 117. Retransmission request destination selecting section 113 then determines whether or not the response time of each receiving node exceeds the time until data for which a retransmission request is made is regenerated. If retransmission request destination selecting section 113 determines that the response times of all the receiving nodes exceed this time until data is regenerated (S344: YES), it terminates this processing flow. On the other hand, if retransmission request destination selecting section 113 determines that the response times of one or more of the receiving nodes are shorter than this time until data is regenerated (S344: NO), it proceeds to step S345.

In step S345, retransmission request destination selecting section 113 subtracts a respective correction value from the response time of each receiving node whose response time is shorter than this time until data is regenerated and calculates an amended response time.

In step S346, retransmission request destination selecting section 113 selects the receiving node with the shortest amended response time among the receiving nodes whose response times are shorter than this time until data is regenerated as a retransmission request destination. Retransmission request destination selecting section 113 reports the IP address of the selected retransmission request destination receiving node, and the sequence number of the data packet for which a retransmission request is to be made, to retransmission request packet creating section 114.

Next, in step S347, retransmission request packet creating section 114 creates a unicast retransmission request packet from the IP address and sequence number reported by retransmission request destination selecting section 113. Retransmission request packet creating section 114 then passes the created retransmission request packet to packet transmitting section 118.

Then, in step S348, packet transmitting section 118 transmits the retransmission request packet created by retransmission request packet creating section 114 to the retransmission request destination receiving node, and terminates this processing flow.

As described above, a communication terminal apparatus according to Embodiment 5 calculates response time correction values based on response times of other receiving nodes, and loss event rates and available empty band estimates of other receiving nodes, using inquiry information exchange packets and response information exchange packets. Then a communication terminal apparatus according to Embodiment 5 selects a receiving node to which a retransmission request is to be made using the calculated response times and their correction values in addition to a bitmap and address list, and makes a retransmission request to the selected receiving node by means of unicast communication. Thus, according to this embodiment, in addition to obtaining the effects of Embodiment 4, a receiving node with a low loss event rate and a large empty band—that is, a receiving node capable of dependably receiving retransmission data—can be selected as a retransmission request destination.

If a retransmission packet is not received after the elapse of a fixed time following transmission of a retransmission request packet, a communication terminal apparatus of the above embodiments may select a new retransmission request destination using a bitmap and address list, and have a retransmission packet transmitted to the selected new retransmission request destination receiving node.

If data for which retransmission has been requested has not been stored in the data storing section, a communication terminal apparatus of the above embodiments may transmit a message indicating that there is no data to a retransmission request source receiving node. Also, if data for which retransmission has been requested has not been stored in the data storing section, a communication terminal apparatus of the above embodiments may terminate retransmission request packet reception processing without doing anything. In this case, the retransmission request packet transmission source receiving node must transmit a retransmission request packet to another receiving node.

In the above embodiments, the retransmission packet receiving section evaluates the validity of a retransmission packet based on a sequence number entered in a table stored in the data storing section, but the retransmission packet receiving section may also conduct a retransmission packet validity check based on information such as the IP address of the retransmission request destination.

In Embodiment 2 above, it is assumed that a receiving node that detects a packet loss waits for a fixed time period in order to integrate retransmission request packets into one, but a receiving node that receives a retransmission request packet may also wait for a fixed time period in order to integrate retransmission packets into one. In this case, a retransmission packet is an explicit multicast packet.

The disclosures of Japanese Patent Application No. 2006-142127, filed on May 22, 2006, and Japanese Patent Application No. 2006-255098, filed on Sep. 20, 2006, including the specifications, drawings and abstracts, are incorporated herein by reference in their entirety.

Industrial Applicability

A communication terminal apparatus according to the present invention has an effect of enabling overall network band consumption and receiving node processing loads to be reduced, and is suitable for use as a video conferencing, network gaming, or suchlike communication terminal apparatus.

The invention claimed is:

1. A communication terminal apparatus that receives a data packet by multicast communication, the communication terminal apparatus comprising:
   a packet receiving section that receives a packet comprising one of a data packet and a retransmission packet as a type of the packet;
   a packet loss detecting section that detects whether a packet loss has occurred in a series of data packets received by the packet receiving section;
   a retransmission request destination selecting section that, when the packet loss detecting section detects an occurrence of the packet loss, selects a retransmission request destination IP address from one or more IP addresses contained in a distribution destination address list of the data packet received by the packet receiving section;
   a retransmission request packet creating section that creates a retransmission request packet that makes a request for retransmission of data of the data packet for which the packet loss occurred to the retransmission request destination IP address;
   a packet transmitting section that transmits the retransmission request packet to the retransmission request destination IP address;
   a packet check section that determines the type of the packet received by the packet receiving section;
   a data storing section that, when the packet check section determines the packet to be the data packet, stores data and a sequence number contained in the data packet; and
   a retransmission packet receiving section that, when the packet check section determines the packet to be the retransmission packet, stores data and a sequence number contained in the retransmission packet in the data storing section.

2. The communication terminal apparatus according to claim 1, wherein:
   the data packet contains a bitmap, which is a bit sequence indicating whether or not the data packet has been distributed, for each of one or more IP addresses contained in the distribution destination address list; and
   the retransmission request destination selecting section selects one bit indicating distribution completion from the bitmap, and selects an IP address corresponding to the selected bit as the retransmission request destination IP address.

3. The communication terminal apparatus according to claim 1, wherein the packet loss detecting section detects that the packet loss has occurred by determining whether or not sequence numbers of the data packets received by the packet receiving section are consecutive.

4. The communication terminal apparatus according to claim 1, wherein the retransmission request packet creating section enters the sequence number of the data packet for which the data retransmission is requested, and an IP address of the communication terminal apparatus serving as a retransmission request source IF address, in the retransmission request packet.

5. The communication terminal apparatus according to claim 1, wherein the retransmission packet receiving section, when the sequence number contained in the retransmission packet and the sequence number for which the retransmission request is made are identical, stores the data and the sequence number contained in the retransmission packet in the data storing section.

6. The communication terminal apparatus according to claim 1, wherein:

the packet comprises one of a retransmission request packet in addition to the data packet and the retransmission packet as the type of the packet;

the communication terminal apparatus further comprises a retransmission request packet wait section that waits for a predetermined time period after the retransmission request destination selecting section selects the retransmission request destination IP address, and receives the retransmission request packet requesting retransmission of data that is identical to data for which the retransmission request is made to the retransmission request destination; and the retransmission request packet creating section enters a retransmission request source address contained in the retransmission request packet received by the retransmission request packet wait section in the retransmission request packet as the retransmission request source address in addition to an address of the communication terminal apparatus.

7. The communication terminal apparatus according to claim 6, wherein the retransmission request packet wait section:

waits for the predetermined time period after the retransmission request destination selecting section selects the retransmission request destination IP address;

when the retransmission request packet is received, determines whether or not a sequence number of data for which the retransmission request is made to the retransmission request destination and a sequence number of data for which the retransmission is requested contained in the retransmission request packet are identical;

if the sequence number of the data for which the retransmission request is made to the retransmission request destination and the sequence number of the data for which the retransmission is requested contained in the retransmission request packet are identical, reports the retransmission request source address entered in the retransmission request packet, to the retransmission request packet creating section, as the retransmission request source address; and terminates a wait state after a fixed time period has elapsed.

8. The communication terminal apparatus according to claim 1, further comprising a daisy-chain distribution check section that determines whether or not the data packet received by the packet receiving section has been transferred by daisy-chain distribution, and if the data packet has been transferred by the daisy-chain distribution, reports all IP addresses entered after an IP address of the communication terminal apparatus among IP addresses entered in the distribution destination address list of the data packet to the retransmission request packet creating section;

wherein the retransmission request packet creating section further creates the retransmission request packet with the IP addresses reported by the daisy-chain distribution check section as retransmission request source addresses in addition to the address of the communication terminal apparatus.

9. A communication terminal apparatus that receives a data packet by multicast communication, the communication terminal apparatus comprising:

a packet receiving section that receives a packet comprising one of a response information exchange packet and a data packet as a type of the packet;

a packet check section that determines the type of the packet received by the packet receiving section;

a retransmission response time calculating section that, when the packet check section determines the packet to be the response information exchange packet, calculates a response time of a transmission source of the response information exchange packet from a transmission time contained in the response information exchange packet and a current time;

a packet loss detecting section that, when the packet check section determines the packet to be the data packet, detects whether a packet loss has occurred in the data packet;

a retransmission request destination selecting section that, when the packet loss detecting section detects an occurrence of the packet loss, selects as a retransmission request destination IP address an IP address for which the response time is shorter than a time until data of the data packet for which the packet loss occurred is regenerated from one or more IP addresses contained in a distribution destination address list of the data packet received by the packet receiving section;

a retransmission request packet creating section that creates a retransmission request packet that makes a request for retransmission of data of the data packet for which the packet loss occurred to the retransmission request destination IP address;

an information exchange section that periodically creates an inquiry information exchange packet; and a packet transmitting section that, when the retransmission request packet creating section creates the retransmission request packet, transmits the retransmission request packet to the retransmission request destination 1P address, and when the information exchange section creates the inquiry information exchange packet, transmits the inquiry information exchange packet to an IP address entered in the distribution destination address list of the data packet after entering the current time as the transmission time in the inquiry information exchange packet.

10. The communication terminal apparatus according to claim 9, wherein:

the packet comprises one of the inquiry information exchange packet in addition to the data packet and the response information exchange packet as the type of the packet;

the information exchange section further, when the packet check section determines the packet to be the inquiry information exchange packet, creates, based on an inquiry source IP address and the transmission time contained in the inquiry information exchange packet, a response information exchange packet containing the inquiry source IP address and the transmission time; and the packet transmitting section further, when the information exchange section creates the response information exchange packet, transmits the response information exchange packet to the inquiry source IP address.

11. A communication terminal apparatus that receives a data packet by multicast communication, the communication terminal apparatus comprising:

a packet receiving section that receives a packet comprising one of a response information exchange packet and a data packet as a type of the packet;

a packet check section that determines the type of the packet received by the packet receiving section;

a session information managing section that, when the packet check section determines the packet to be the response information exchange packet, calculates a response time of a transmission source of the response information exchange packet from a transmission time contained in the response information exchange packet and a current time, and estimates an available band of the transmission source of the response information exchange packet from a loss event rate contained in the response information exchange packet and a data amount of the response information exchange packet successfully received;

a retransmission response time calculating section that, when the packet check section determines the packet to be the response information exchange packet, calculates a correction value for amending the response time of the transmission source of the response information exchange packet from the loss event rate contained in the response information exchange packet and the available band of the transmission source of the response information exchange packet estimated by the session information managing section;

a packet loss detecting section that, when the packet check section determines the packet to be the data packet, detects whether a packet loss has occurred in the data packet;

a retransmission request destination selecting section that, when the packet loss detecting section detects an occurrence of the packet loss, selects as a retransmission request destination IP address an IP address for which the response time is shorter than a time until data of the data packet for which the packet loss occurred is regenerated, and for which an amended response time amended using the correction value is shortest, from one or more IP addresses contained in a distribution destination address list of the data packet received by the packet receiving section;

a retransmission request packet creating section that creates a retransmission request packet that makes a request for retransmission of data of the data packet for which the packet loss occurred to the retransmission request destination IP address;

an information exchange section that periodically creates an inquiry information exchange packet; and a packet transmitting section that, when the retransmission request packet creating section creates the retransmission request packet, transmits the retransmission request packet to the retransmission request destination IP address, and when the information exchange section creates the inquiry information exchange packet, transmits the inquiry information exchange packet to an IP address entered in the distribution destination address list of the data packet after entering the current time as the transmission time in the inquiry information exchange packet.

12. The communication terminal apparatus according to claim 11, wherein:

the packet comprises one of the inquiry information exchange packet in addition to the data packet and the response information exchange packet as the type of the packet;

the information exchange section further, when the packet check section determines the packet to be the inquiry information exchange packet, calculates the loss event rate from a sequence number and the response time contained in the inquiry information exchange packet, calculates the data amount of the inquiry information exchange packet successfully received, and creates the response information exchange packet containing an inquiry source IP address contained in the inquiry information exchange packet, the transmission time, the loss event rate, and the successfully received data amount; and the packet transmitting section further, when the information exchange section creates the response information exchange packet, transmits the response information exchange packet to the inquiry source IP address.

* * * * *